United States Patent
Belgera et al.

(10) Patent No.: US 10,514,670 B2
(45) Date of Patent: Dec. 24, 2019

(54) ENERGY MANAGEMENT APPARATUS, MANAGEMENT SYSTEM, POWER CONSUMPTION MONITORING METHOD AND PROGRAM

(71) Applicants: Kabushiki Kaisha Toshiba, Minato-ku (JP); Toshiba Infrastructure Systems & Solutions Corporation, Kawasaki-shi (JP)

(72) Inventors: Angela Siega Belgera, Yokohama (JP); Nobutaka Nishimura, Koganei (JP)

(73) Assignees: Kabushiki Kaisha Toshiba, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 11 days.

(21) Appl. No.: 15/757,582

(22) PCT Filed: Mar. 14, 2017

(86) PCT No.: PCT/JP2017/010148
§ 371 (c)(1),
(2) Date: Mar. 5, 2018

(87) PCT Pub. No.: WO2017/203799
PCT Pub. Date: Nov. 30, 2017

(65) Prior Publication Data
US 2018/0246483 A1    Aug. 30, 2018

(30) Foreign Application Priority Data

May 25, 2016 (JP) .................. 2016-104508

(51) Int. Cl.
*G06F 19/00* (2018.01)
*G05B 19/042* (2006.01)
*H02J 13/00* (2006.01)

(52) U.S. Cl.
CPC ............ *G05B 19/042* (2013.01); *H02J 13/00* (2013.01); *G05B 2219/2639* (2013.01)

(58) Field of Classification Search
CPC .. B60N 2/06; B60N 2/34; A61B 2018/00577; A61B 2018/00684; A61B 2018/00738;
(Continued)

(56) References Cited

U.S. PATENT DOCUMENTS

2009/0259346 A1* 10/2009 Reed .................. G06Q 50/06
                                                        700/295
2011/0202185 A1* 8/2011 Imes .................. G05B 15/02
                                                        700/277
(Continued)

FOREIGN PATENT DOCUMENTS

JP    2014-120108 A    6/2014
JP    2015-41379 A     3/2015

OTHER PUBLICATIONS

International Search Report dated May 9, 2017 in PCT/JP2017/010148 filed Mar. 14, 2017.

*Primary Examiner* — Kidest Bahta
(74) *Attorney, Agent, or Firm* — Oblon, McClelland, Maier & Neustadt, L.L.P.

(57) ABSTRACT

An energy management apparatus according to an embodiment is used in a management system having an information device management apparatus that has a first storage storing information device information regarding at least one information device and sends to the energy management apparatus first power consumption information regarding the power consumption by the information device. The energy management apparatus has a receiver, a first acquisitor, and a second storage. The receiver receives, regarding zones related to a building, a detection signal regarding detection of a person in each of the zones. The first acquisitor acquires second power consumption information regarding power
(Continued)

consumed by a facility device in the zones. The second storage stores the first power consumption information and the second power consumption information in connection with the zones, based on the detection signal received by the receiver.

7 Claims, 26 Drawing Sheets

(58) Field of Classification Search
CPC ...... A61B 2018/00767; A61B 2018/00779; A61B 2018/2035; A61B 2018/20361; A61B 2018/205547; A61F 2009/00844; A61F 2009/00855; A61F 2009/00878; A61F 2009/00882; A61F 2009/00897; A61F 9/00802; A61F 9/00804; A61F 9/00814; G01J 11/00; G01J 1/10
See application file for complete search history.

(56) References Cited

U.S. PATENT DOCUMENTS

| | | | |
|---|---|---|---|
| 2012/0089263 A1* | 4/2012 | Park | H02J 13/001 700/291 |
| 2015/0057820 A1 | 2/2015 | Kefayati et al. | |
| 2016/0004297 A1* | 1/2016 | Kazuno | G06Q 30/06 713/320 |
| 2016/0011616 A1* | 1/2016 | Janous | G05B 15/02 700/297 |

\* cited by examiner

FIG. 3

DETECTION RESULTS TABLE — 111

| ZONE ID | PERSON PRESENT/ABSENT |
|---|---|
| ZONE #1 | PRESENT |
| ZONE #2 | ABSENT |
| ⋮ | ⋮ |
| ZONE #m | PRESENT |

FIG. 4

ENTRY-EXIT TABLE — 112

| PERSONAL ID | STATE |
|---|---|
| PERSON #1 | IN BUILDING |
| PERSON #2 | IN BUILDING |
| ⋮ | ⋮ |
| PERSON #n | EXITED BUILDING |

ZONE TABLE

| ZONE ID | INFORMATION DEVICE POWER | | | FACILITY DEVICE POWER | | | TOTAL POWER | INFORMATION DEVICE ELECTRIC ENERGY | FACILITY DEVICE ELECTRIC ENERGY | TOTAL ELECTRIC ENERGY |
|---|---|---|---|---|---|---|---|---|---|---|
| | PC | SHARED DEVICE | OTHER | AIR-CONDITIONING EQUIPMENT | LIGHTING DEVICE | OTHER | | | | |
| ZONE #1 | Pw11 | Pw12 | Pw13 | Pw14 | Pw15 | Pw16 | Pw1 | Ee11 | Ee12 | Ee1 |
| ZONE #2 | Pw21 | Pw22 | Pw23 | Pw24 | Pw25 | Pw26 | Pw2 | Ee21 | Ee22 | Ee2 |
| ... | ... | ... | ... | ... | ... | ... | ... | ... | ... | ... |
| ZONE #m | Pwm1 | Pwm2 | Pwm3 | Pwm4 | Pwm5 | Pwm6 | Pwm | Eem1 | Eem2 | Eem |

FIG. 8

INFORMATION DEVICE TABLE 122

| INFORMATION DEVICE ID | ZONE ID | POWER CONSUMPTION | ELECTRIC ENERGY CONSUMPTION | OPERATION STATE | POWER SUPPLY USED | HISTORY INFORMATION |
|---|---|---|---|---|---|---|
| PC#1 | ZONE #1 | pw01 | ee01 | SLEEPING | BATTERY | XXXX |
| SHARED DEVICE #2 | ZONE #1 | pw02 | ee02 | ON | AC | YYYY |
| ... | ... | ... | ... | ... | ... | ... |
| PC#t | ZONE #m | pw0t | ee0t | ON | AC | ZZZZ |

FIG. 9

FACILITY DEVICE TABLE 123

| FACILITY DEVICE ID | ZONE ID | POWER CONSUMPTION | ELECTRIC ENERGY CONSUMPTION | OPERATION STATE | HISTORY INFORMATION |
|---|---|---|---|---|---|
| FACILITY DEVICE #1 | ZONE #1 | pw11 | ee11 | OFF | AAAA |
| FACILITY DEVICE #2 | ZONE #1 | pw12 | ee12 | ON | BBBB |
| ... | ... | ... | ... | ... | ... |
| FACILITY DEVICE #r | ZONE #m | pw1t | ee1t | ON | CCCC |

FIG. 11

INFORMATION DEVICE TABLE (511)

| INFORMATION DEVICE ID | ZONE ID |
|---|---|
| PC#1 | ZONE #1 |
| SHARED DEVICE #2 | ZONE #1 |
| ⋮ | ⋮ |
| PC#t | ZONE #m |

FIG. 12

DEVICE USED TABLE (512)

| PERSONAL ID | INFORMATION DEVICE ID |
|---|---|
| PERSON #1 | PC#1 |
| PERSON #2 | PC#2 |
| ⋮ | ⋮ |
| PERSON #n | PC#s |

FIG. 21

ENTRY-EXIT TABLE (3112)

| PERSONAL ID | TENANT ID | STATE |
|---|---|---|
| PERSON #1 | TENANT #1 | IN BUILDING |
| PERSON #2 | TENANT #1 | IN BUILDING |
| ⋮ | ⋮ | ⋮ |
| PERSON #n | TENANT #h | EXITED BUILDING |

FIG. 22

TENANT TABLE (3113)

| ZONE ID | TENANT ID |
|---|---|
| ZONE #1 | TENANT #1 |
| ZONE #2 | TENANT #1 |
| ⋮ | ⋮ |
| ZONE #m | TENANT #h |

FIG. 25

ZONE TABLE 3121

| ZONE ID | INFORMATION DEVICE POWER | | | FACILITY DEVICE POWER | | | TOTAL POWER | INFORMATION DEVICE ELECTRIC ENERGY | FACILITY DEVICE ELECTRIC ENERGY | TOTAL ELECTRIC ENERGY |
|---|---|---|---|---|---|---|---|---|---|---|
| | PC | SHARED DEVICE | OTHER | AIR-CONDITIONING EQUIPMENT | LIGHTING DEVICE | OTHER | | | | |
| ZONE #1 | Pw11 | Pw12 | Pw13 | Pw14 | Pw15 | Pw16 | Pw1 | Ee11 | Ee12 | Ee1 |
| ZONE #2 | Pw21 | Pw22 | Pw23 | Pw24 | Pw25 | Pw26 | Pw2 | Ee21 | Ee22 | Ee2 |
| ... | ... | ... | ... | ... | ... | ... | ... | ... | ... | ... |
| ZONE #m | Pwm1 | Pwm2 | Pwm3 | Pwm4 | Pwm5 | Pwm6 | Pwm | Eem1 | Eem2 | Eem |

FIG. 26

INFORMATION DEVICE TABLE 3122

| INFORMATION DEVICE ID | ZONE ID | POWER CONSUMPTION | ELECTRIC ENERGY CONSUMPTION | OPERATION STATE | POWER SUPPLY USED | HISTORY INFORMATION |
|---|---|---|---|---|---|---|
| PC#1 | ZONE #1 | pw01 | ee01 | SLEEPING | BATTERY | XXXX |
| SHARED DEVICE #2 | ZONE #1 | pw02 | ee02 | ON | AC | YYYY |
| ... | ... | ... | ... | ... | ... | ... |
| PC#t | ZONE #m | pw0t | ee0t | ON | AC | ZZZZ |

FACILITY DEVICE TABLE

| FACILITY DEVICE ID | ZONE ID | POWER CONSUMPTION | ELECTRIC ENERGY CONSUMPTION | OPERATION STATE | HISTORY INFORMATION |
|---|---|---|---|---|---|
| FACILITY DEVICE #1 | ZONE #1 | pw11 | ee11 | OFF | AAAA |
| FACILITY DEVICE #2 | ZONE #1 | pw12 | ee12 | ON | BBBB |
| ... | ... | ... | ... | ... | ... |
| FACILITY DEVICE #r | ZONE #m | pw1t | ee1t | ON | CCCC |

| FACILITY DEVICE TABLE | | | 6511 |
|---|---|---|
| INFORMATION DEVICE ID | ZONE ID | TENANT ID |
| PC#1 | ZONE #1 | TENANT #1 |
| SHARED DEVICE #2 | ZONE #1 | TENANT #1 |
| ⋮ | ⋮ | ⋮ |
| PC#t | ZONE #m | TENANT #h |

| DEVICE USED TABLE | 6512 |
|---|---|
| PERSONAL ID | INFORMATION DEVICE ID |
| PERSON #1 | PC#1 |
| PERSON #2 | PC#2 |
| ⋮ | ⋮ |
| PERSON #n | PC#s |

ENERGY MANAGEMENT APPARATUS, MANAGEMENT SYSTEM, POWER CONSUMPTION MONITORING METHOD AND PROGRAM

TECHNICAL FIELD

Embodiments described herein relate generally to an energy management apparatus, a management system, a power consumption monitoring method and a program.

BACKGROUND ART

As a result of investigations of reducing the consumed energy in a building such as an office building, the energy consumed by facility devices such as air-conditioning equipment and lighting devices that are installed in the building has been reduced. In recent years, however, of the energy consumed by an overall building, the portion of energy consumed by information devices such as computers, printers, and copiers has increased. Although there have been some reductions made in the energy consumed by information devices, the methods and solutions therefor are often provided independently for information devices, and investigation regarding effective means to manage consumed energy in a building that includes information devices has not been done.

CITATION LIST

Patent Literature

Patent Literature 1

Japanese Unexamined Patent Application, First Publication No. 2015-041379

SUMMARY OF INVENTION

Technical Problem

The problem to be solved by the present invention is that of providing an energy management apparatus, a management system, and a power consumption monitoring method effective in managing energy consumption in a building that includes information devices.

Solution to Problem

An energy management apparatus according to an embodiment is used in a management system having an information device management apparatus that has a first storage storing information device information regarding at least one information device and sends to the energy management apparatus first power consumption information regarding the power consumption by the information device. The energy management apparatus has a receiver, a first acquisitor, and a second storage. The receiver receives, regarding zones related to a building, a detection signal regarding detection of a person in each of the zones. The first acquisitor acquires second power consumption information regarding power consumed by a facility device in the zones. The second storage stores the first power consumption information and the second power consumption information in connection with the zones, based on the detection signal received by the receiver.

BRIEF DESCRIPTION OP DRAWINGS

FIG. 3 illustrates an example of a detection results table in the first embodiment.

FIG. 4 illustrates an example of an entry-exit table in the first embodiment.

FIG. 7 illustrates an example of a zone table in the first embodiment.

FIG. 8 illustrates an example of an information device table in the first embodiment.

FIG. 9 illustrates an example of a facility device table in the first embodiment.

FIG. 11 illustrates an example of an information device table in the first embodiment.

FIG. 12 illustrates an example of a device used table in the first embodiment.

FIG. 21 illustrates an example of an entry-exit table in the second embodiment.

FIG. 22 illustrates an example of a tenant table in the second embodiment.

FIG. 25 illustrates an example of a zone table in the second embodiment.

FIG. 26 illustrates an example of an information device table in the second embodiment.

FIG. 27 illustrates an example of a facility device table in the second embodiment.

DESCRIPTION OF EMBODIMENTS

Figure 1:
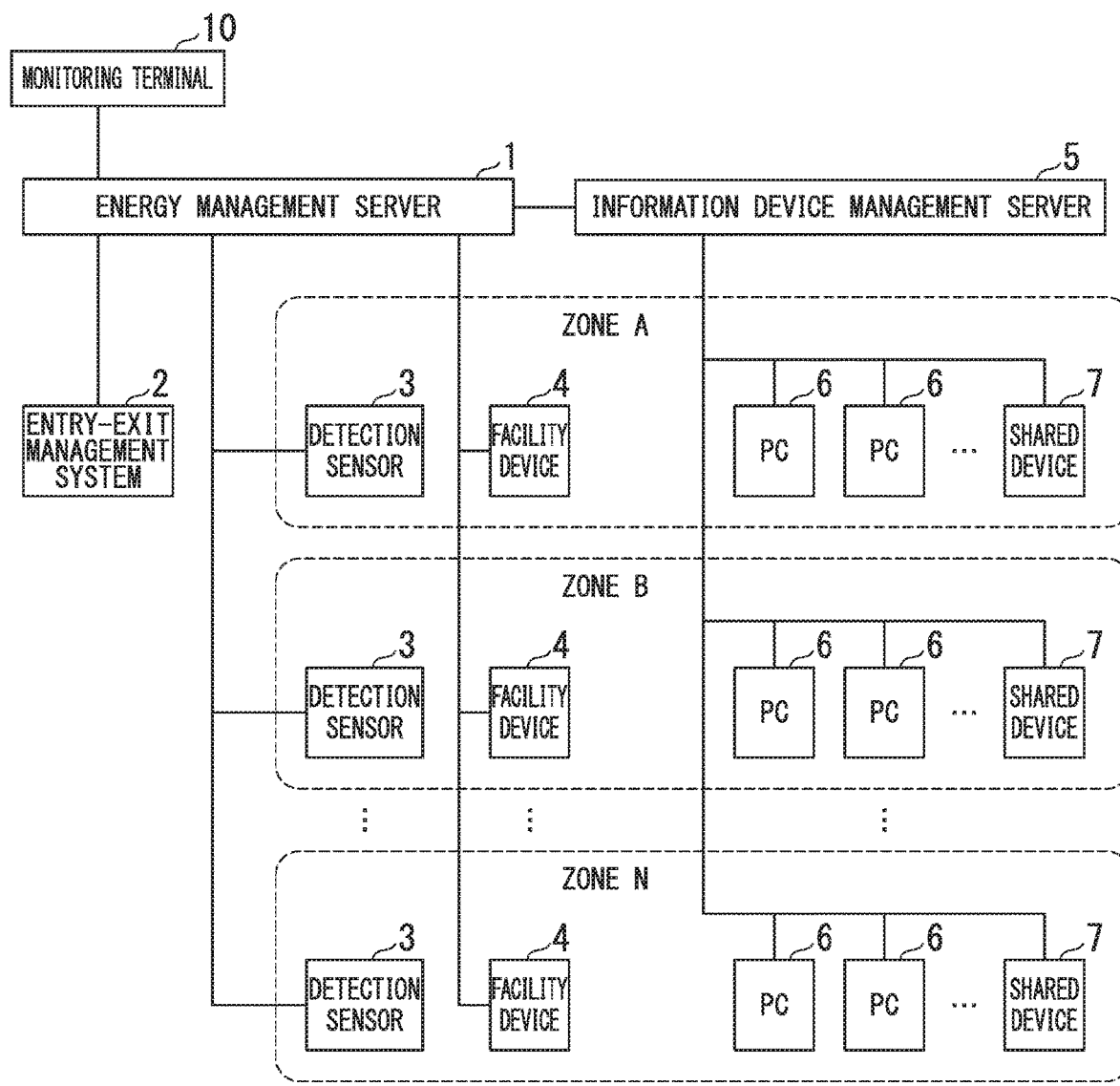
FIG. 1 is a block diagram illustrating an example of the configuration of a management system in a first embodiment.

An energy management apparatus, a management system, a power consumption monitoring method and a program of an embodiment will be described below, with references made to drawings. In the following embodiments, it is assumed that the portions attached the same reference numerals perform the same operation, and duplicate explanation will be omitted.

[First Embodiment]

FIG. 1 is a block diagram illustrating an example of the configuration of a management system of a first embodiment. The management system monitors the energy consumed by facility devices provided in a building and energy consumed by at least one information device used in the building. The facility devices in the following embodiments include not only devices provided within the building, but also devices provided outside the building, such as the outside unit of air-conditioning equipment. The same is true for information devices. The building being managed by the management system is, for example, an office building. Although the description to follow is for the case of the building being an office building, in the management system, the building using information devices may be, for example, a library, a research facility, or a university building. An information device is a desktop or laptop personal computer (PC), a printer, a copier, a multifunction printer, or a cable or wireless network device enabling communication between an IP telephones and a computers.

The management system has an energy management server 1, information device management server 5, and a monitoring terminal 10. The energy management server 1 may be provided in a building that is targeted for energy reduction by the management system, or may be provided in a different location. If the energy management server 1 is provided in a location different from the building, the energy management server 1 communicates with an entry-exit management system 2, and a detection sensor 3 and facility device 4 provided in the building, via a network constituted using one or both of a cable n or a wireless network. The information device management server 5, similar to the energy management server 1, may be provided in the building or in a location different from the building. One or both of the energy management server 1 and the information device management server 5 may be constituted using cloud computing. The building that is the target of energy reduction by the management system may be multiple, may be a group of a plurality of office buildings, or may be a plurality of buildings constructed in some region.

The energy management server 1 acquires entry-exit information regarding entering and exiting the building from the entry-exit management system 2. The entry-exit management system 2 detects a person entering the building that is being managed and a person exiting from the building, and generates entry-exit information based on the detection result. The energy management server 1 acquires detection signals related to the detection of persons from each of a plurality of detection sensor 3 provided within the building. In the following, the detection signal will be referred to as presence-absence information. The detection sensors 3 are provided in each of a plurality of zones regarding the building. Each of the detection sensors 3 determines the presence or absence of a person or persons in the zone, and generates presence-absence information based on the determination result. The presence-absence information includes a zone ID that uniquely identifies a zone and information that indicates the presence or absence of a person or persons in that zone. A detection sensor 3 has, for example, an image sensor or an infrared sensor, and detects the presence-absence or the movement of a person or persons, based on the output from the sensor. If the detection accuracy of the detection sensor 3 is high and can detect the number of persons, the detection sensor 3 may notify the energy management server 1 of presence-absence information that indicates the number of persons, rather than the presence-absence of a person or persons. The presence-absence information is also referred as presence information.

A zone is established as a predetermined region of a building, based on the positions of a plurality of PCs 6 and shared devices 7 used within the building. Zones may be established by dividing building into regions, or may be established so that there exist partial regions in which there is overlap between neighboring zones. Zones may be established in accordance with the positions of information devices that are divided into groups based on a policy of energy reduction. Specifically, if the regions of the building are the floors on each level of the building, one or a plurality of zones are established on each floor.

The energy management server 1 controls the facility devices 4 provided in each zone, based on entry-exit information acquired from the entry-exit management system 2 and the presence-absence information acquired from the detection sensors 3. The facility devices 4 are provided in the building, for which the consumed electrical power changes directly or indirectly in response to the operation state. A facility device 4 is, for example, a light device or air-conditioning equipment, an air intake or exhaust fan, a water-feed pump, a hot-water supplier, or blinds provided at a window. Although blinds are not a device that constantly consumes energy, the amount of sunlight from the window is changed by opening and closing the blinds, thereby indirectly changing the power consumed by air-conditioning equipment and the like.

The energy management server 1 collects the entry-exit information and the presence-absence information and transmits data obtained by collecting to the information device management server 5 as collection results. The energy management server 1 acquires the first power consumption information regarding power consumed by the information devices controlled by the information device management server 5. The energy management server 1 acquires the second power consumption information regarding the power consumed by the facility devices. The energy management server 1 stores the first and second power consumption information in associated with zones, based on the entry-exit information and the presence-absence information.

The monitoring terminal 10 is connected to the energy management server 1 to enable communication. The monitoring terminal 10 acquires and displays information stored in the energy management server 1, based on the first and second power consumption information. The monitoring terminal 10 is, for example, is used by an administrator of the building. By operating the monitoring terminal 10, the administrator causes display on the monitoring terminal 10 and can verify and monitor the power consumption related to the building. Although FIG. 1 illustrates an example of a management system having one monitoring terminal 10, the management system may have a plurality of monitoring terminals 10. The monitoring terminal 10 may be provided in the same location as the energy management server 1, or at a different location. If the energy management server 1 is implemented by using cloud computing, the monitoring terminal 10 acquires and displays information by accessing computing resources that constitute the energy management server 1, via a network.

The energy management server 1 and the information device management server 5 are connected to enable communication. The energy management server 1 and the information device management server 5 may be connected by a dedicated network or a local area network, or may be connected via the Internet. If the energy management server 1 and the information device management server 5 communicate via the Internet, the energy management server 1 and the information device management server 5 may use a VPN (virtual private network) to communicate.

The information device management server 5 acquires the presence-absence of a person in each zone in the building and the entry and exit to and from the building from the collection results. The information device management server 5, based on information regarding persons in each zone, controls the information devices belonging to each zone and reduces the power consumed by the information devices in the building. An information device is a PC 6 or shared device 7 used by a person or persons. The PC 6 is a laptop or a desktop computer. A shared device 7 is a printer, a copier, a multifunction printer, a hub enabling communication between computers, a network device such as a switch or wireless LAN access point, or a device shared by a plurality of persons, such as an IP telephone. The information device management server 5 acquires information indicating the power or electric energy consumed by the PCs 6 and the shared devices 7 and transmits the acquired information to the energy management server 1. At least one detection sensor 3 and one or a plurality of facility devices 4 are provided in each zone of the building. At least one or both of a PC 6 and shared device 7 belong to each zone of the building. The information device management server 5 and the PCs 6 and shared devices 7 may be connected by a dedicated network or a local area network, or may be connected via the Internet. If the information device management server 5 and the PCs 6 and shared devices 7 communicate via the Internet, the information device management server 5 and the PCs 6 and shared devices 7 may use a VPN to communicate.

Figure 2:
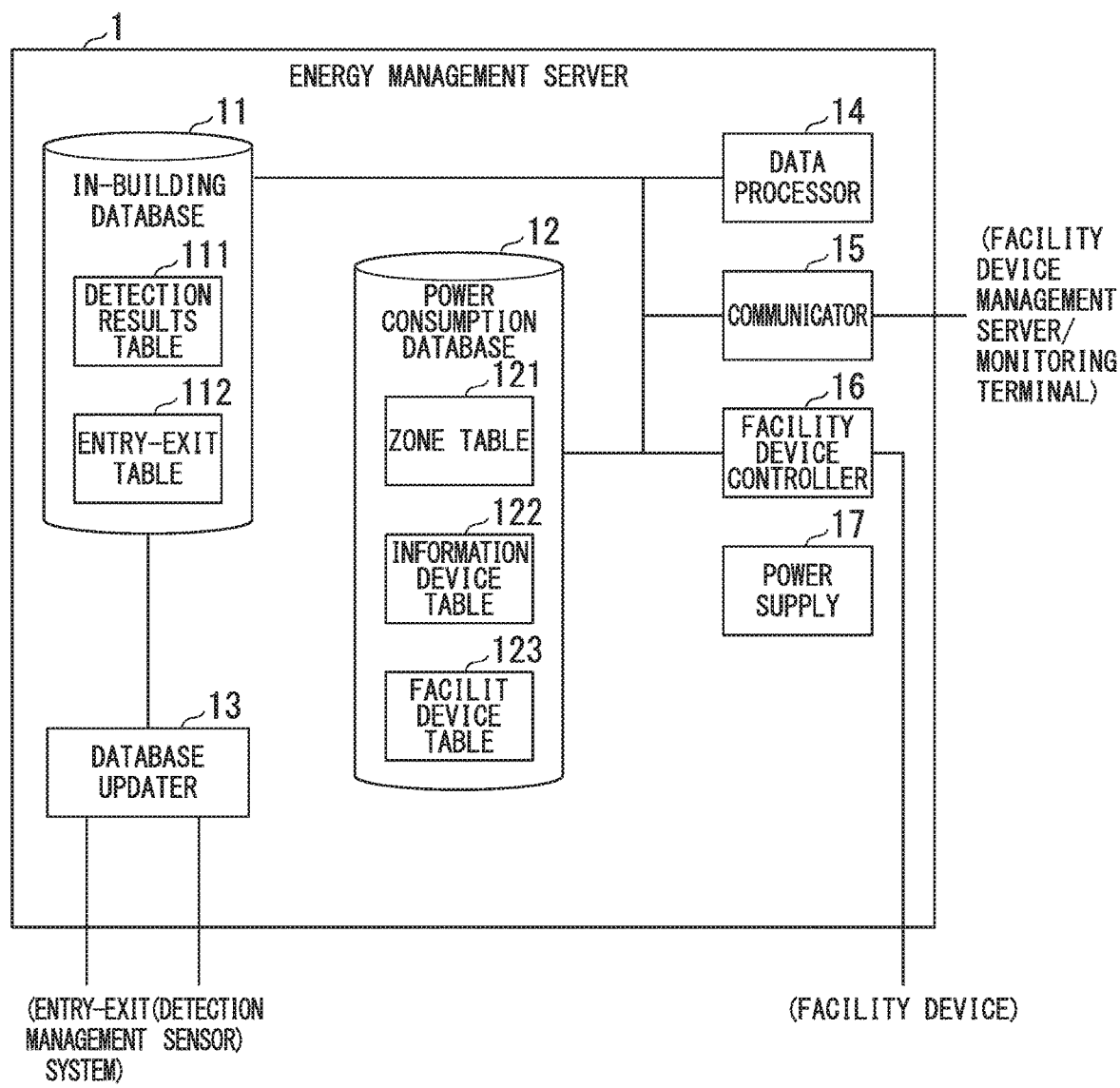
FIG. 2 is a block diagram illustrating an example of the configuration of an energy management server in the first embodiment.

FIG. 2 is a block diagram illustrating an example of the configuration of the energy management server 1 in the first embodiment. The energy management server 1 has an in-building database 11, a power consumption database 12, a database updater 13, a data processor 14, a communicator 15, a facility device controller 16, and a power supply 17.

The in-building database 11 stores, as information regarding persons in the building, a detection results table 111 and an entry-exit table 112. The detection results table 111 stores the presence/absence of persons in each zone. The entry-exit table 112 stores the state of entry-exit for each person using the building or the presence or absence of a person in the building. The power consumption database 12 stores a zone table 121, an information device table 122, and a facility device table 123. The zone table 121 stores, for each zone, information regarding the power consumption of information devices such as facility device 4, the PCs 6 and the shared devices 7. The information device table 122 sores, for each information device, information regarding the power consumption of information devices such as the PCs 6 and the shared devices 7. The facility device table 123 stores, for each facility device 4, information regarding the power consumption of the facility device 4.

FIG. 3 illustrates an example of the detection results table 111 in the first embodiment. The detection results table 111 includes columns for the Zone ID item and the Person Present/Absent item for persons. Rows exist for each zone. The Zone ID item stores a zone ID that uniquely distinguishes a zone (for example, ZONE #1). The Person Present/Absent item stores whether a person is present or absent in the zone indicated by the zone ID in the same row. Present indicates that at least one person is detected. Absent indicates that no person is detected. For example, the detection results table 111 in FIG. 3 stores that a person is absent from the zone indicated by ZONE #2. Although the detection results table 111 in FIG. 3 is an example of columns having the two items Zone ID and Person Present/Absent, the detection results table 111 may include columns of other items. For example, a Time column of the time that the Person Present/Absent item was updated, and a column of the number of persons when the detection sensor 3 can detect the number of persons may be included.

FIG. 4 illustrates an example of the entry-exit table 112 in the first embodiment the entry-exit table 112 includes columns for Personal ID items and for the State items of entry-exit. Rows exist for each individual person who enters and exits the building. The Personal ID item stores a personal ID that uniquely distinguishes a person (for example PERSON #1) who enters and exits the building. The State item of the entry-exit state stores whether a person indicated by the personal ID of the same row is in the building or has already exited the building, with "In building", and "Exited building". For example, the entry-exit table 112 of FIG. 4 stores that the person distinguished by PERSON #2is currently in the building. Although the entry-exit table 112 as the example illustrated in FIG. 4 has columns of the two items indicating the personal ID and the entry-exit state, the entry-exit table may include columns of other items. For example, it may include a column of the time at which the entry-exit state was updated.

Figure 5:
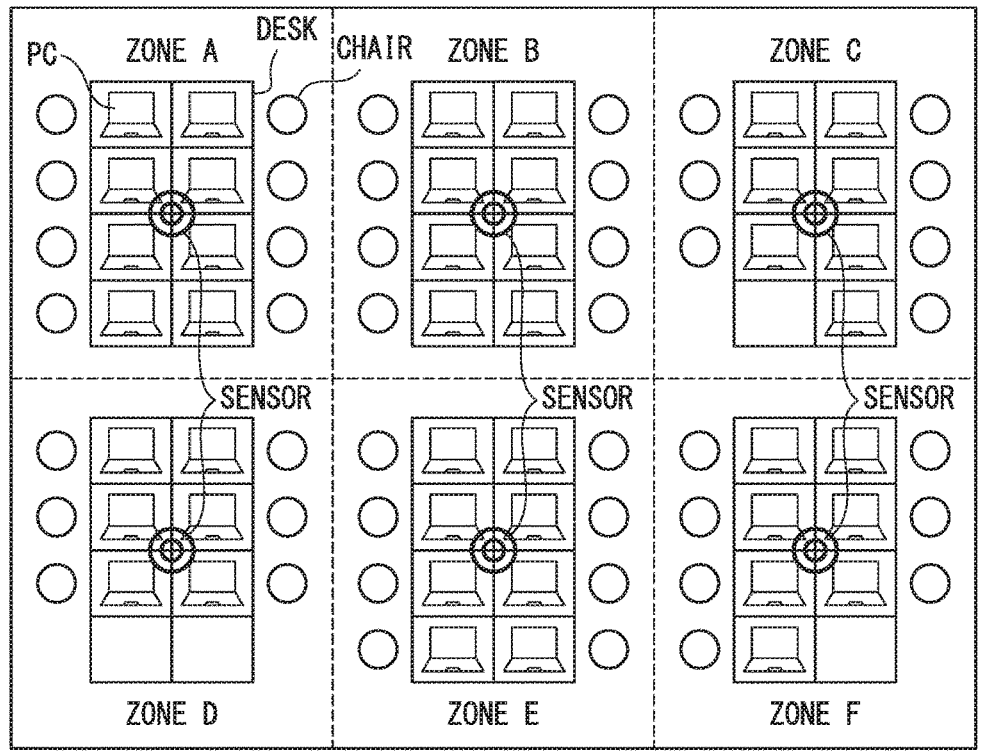
FIG. 5 is a first drawing illustrating an example of zones in a building in the first embodiment.
Figure 6:
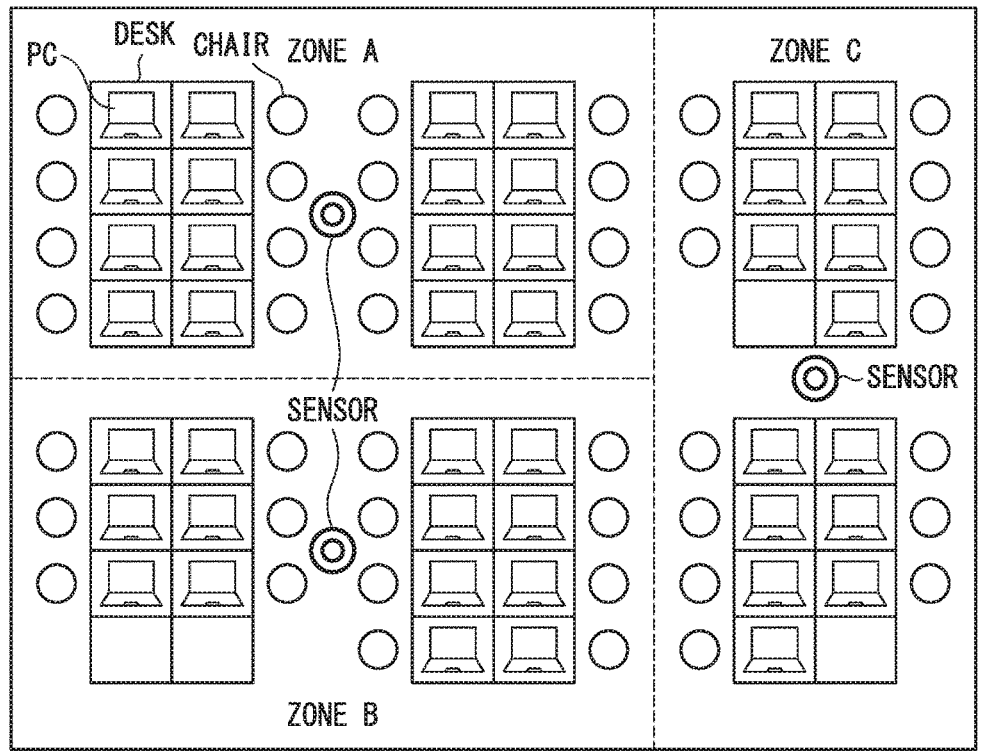
FIG. 6 is a second drawing illustrating an example of zones in a building in the first embodiment.

The zones into which the region inside a building is divided will now be described. FIG. 5 and FIG. 6 illustrate examples of zones in the building in the first embodiment and examples of division into zones, based on desks, chairs, and PCs provided on the desks used in an office. In the example illustrated in FIG. 5, one zone is established for each collection of desks provided with PCs, the office being divided into the six zones A to F. In the example illustrated in FIG. 6, one zone is established for each two collections of desks provided with PCs, the office being divided into the three zones A to C. A zone is established based on the location of information devices such as the PCs 6. The detection sensors 3 provided in each zone as sensors are, for example, mounted to the ceiling and sense the presence or absence of persons in the zone.

FIG. 7 illustrates an example of a zone table 121 in the first embodiment. The zone table 121 stores, for each zone, the power consumption and the electric energy consumption within the building. The power consumption and the electric energy consumption for each zone are divided for storage, between the power consumption and the electric energy consumption of the facility devices 4, and the power consumption and the electric energy consumption of the information devices such as the PCs 6 and the shared devices 7 controlled by the information device management server 5. The zone table 121 includes columns for each of the items of the zone IDs, the power of the information devices including PCs and shared devices, the power of facility devices including air-conditioning equipment and lighting devices, the total power, the electric energy of the information devices, the electric energy of the facility devices, and the total electric energy. Rows exist for each of the zones. The zone IDs are stored in the Zone ID items. The Information Device Power item includes items for PCs and shared devices and the like included in the information devices, and the values of the power consumed by PCs and shared devices and the like is stored therein. The facility device power item includes items for the air-conditioning equipment and lighting devices included in the facility devices, and the values of the power consumed by the air-conditioning equipment and light devices and the like is stored therein. The Total Power items stores total values of power consumed by the information devices and facility devices provided in the building. The Information Device Electric Energy item stores the value of the electric energy consumed by information devices in a period of time that is the collection unit. The Facility Device Electric Energy item stores the values of the electric energy consumed by facility devices in a period of time that is the collection unit.

Although in the zone table 121 illustrated in FIG. 7 the information devices are divided into PCs, shared devices, and other, other items may be included in the information devices. Also, although the facility devices are divided into air-conditioning equipment, lighting devices, and other, other items may be included in the facility devices. The values of power consumed by PCs and shared devices in the zone table 121, rather than being the value of the total of the power consumption of the PCs and shared devices belonging to a zone, may be the values of power consumed by the individual PCs or shared devices. The electric energy of the information devices and of the facility devices and the total electric energy may be stored as a plurality of power amounts in collection units of time of one hour, 12 hours, one day, and one week.

FIG. 8 illustrates an example of the information device table 122 in the first embodiment. The information device table 122 includes columns for the items of the information device ID, the power consumption, the electric energy consumption, the operation state, the power supply used and history information. Rows exist for each information device. The Information Device ID item stores an information device ID (for example PC #1) that uniquely distinguishes an information device such as a PC 6 or a shared device 7. The Zone ID item stores a zone ID indicating a zone to which the information device indicated by the information device ID in the same row belongs. The Power Consumption and the Electric Energy Consumption items store the power consumption and the electric energy consumption of the information device indicated by the information device ID in the same row.

The Operation State item stores information indicating the operation state of the information device indicated by the information device ID in the same row. The operation state is, for example, on, off, or sleeping. On is the state in which the information device is operating, and off the state in which the information device is stopped. Sleeping is the state in which the power consumed is less than in the on state, and from which the time required for the information device to reach the operating state is shorter than from the off state. The Power Supply Used item stores information indicating the power supply used by the information device indicated by the information device ID in the same row. The power supply is, for example, battery or alternating current (AC). Battery is the state in which a primary or second battery of the information device is used as a power supply, and AC is the state in which a power supply external to the information device, for example, a commercial power mains is used.

The History Information item stores the history of changes in the operation state of the information device indicated by the information device ID in the same row. Specifically, the history includes information that indicates the time at which the operation state changed, in combination with the operation state after the change. For example, the information device table 122 of FIG. 8 stores that the information device (PC 6) indicated by PC #1 belongs to the zone indicated by ZONE #1, and that power consumption, power consumption amount, operation state, power supply used, and history information of that information device are, respectively, "pw01", "ee01", "SLEEPING", "BATTERY", and "XXXX".

FIG. 9 illustrates an example of a facility device table 123 in the first embodiment. The facility device table 123 includes columns for the items of the Facility device ID, the Zone ID, the Power Consumption, the Electric Energy Consumption, the Operation State, and the History Information. Rows exist for each facility device 4. The Facility device ID item stores a facility device ID that uniquely distinguishes the facility device 4. The Zone ID item stores a zone ID that indicates the zone in which the facility device 4 indicated by the facility device ID in the same row is provided. The Power Consumption and the Electric Energy Consumption items store, respectively, the power consumption and electric energy consumption of the facility device 4 indicated by the facility device ID in the same row. The Operation State item stores the operation state of the facility device 4 indicated by the facility device ID in the same row. The operation state is, for example, on or off. The History Information item stores a history of changes in the operation state of the facility device 4 indicated by the facility device ID in the same row. The history is the same kind of information as the history information in the information device table 122. For example, the facility device table 123 of FIG. 9 stores that the facility device 4 indicated by FACILITY DEVICE #2 belongs to the zone indicated by ZONE #1, and that the power consumption, power consumption amount, operation state, and history information of the facility device 4 are, respectively, "pw12", "ee12", "ON", and "BBBB".

Returning now to FIG. 2, the description of the energy management server 1 will be continued. When the database updater 13 acquires entry-exit information from the entry-exit management system 2, it updates the entry-exit table 112, based on the entry-exit information. The entry-exit information includes a personal ID that uniquely distinguishes a person who has entered or exited and information indicating whether the person who has either entered or exited the building. The database updater 13 updates the state (entry/exit) in the entry-exit table 112 corresponding with the personal ID included in the entry-exit information, based on the entry-exit information. When the database updater 13 acquires presence-absence information from the detection sensors 3 provided in each of the zones, it updates the detection results table 111, based on the presence-absence information. The presence-absence information includes a zone ID that uniquely identifies the zone, and information indicating the presence or absence of a person or persons in that zone. The database updater 13 updates whether or not a person associated with the zone ID included in the presence-absence information is present/absence (presence or absence), based on the presence-absence information.

The data processor 14 generates data, based on the presence-absence information acquired from the database updater 13 and on the zone IDs of a plurality of zones of the building. Specifically, the data processor 14 collects information stored in the detection results table 111 and the entry-exit table 112 and detects the zone IDs for which a change occurred in the information or personal IDs for the user. The data processor 14 may collect information at a fixed interval, or may collect information in response to a request from the information device management server 5. The data processor 14 outputs to the communicator 15 the collection results as data including the zone ID that has changed or the personal ID of a person and makes a request to the communicator 15 to transmit the collection results. The data processor 14 may further include into the collection results the zone IDs of zones in which persons are present. The data processor 14 collects the detection results table 111 and the entry-exit table 112 in the in-building database 11 at a fixed interval and generates the collection results as data. In this case, the collection results include information indicating the zones in which persons are present and the zones in which persons are not present and the personal IDs of persons currently in the building. The communicator 15 transmits to the information device management server 5 the collection results output from the data processor 14.

The data processor 14 receives state information from the information device management server 5 as the first power consumption information, via the communicator 15. The state information is information regarding power consumed by information devices such as PCs 6 and shared devices 7. The state information includes information indicating, for example, the information device ID, the zone ID of a zone to which the information device indicated by the information device ID belongs, the power consumption, the electric energy consumption of the information device, and information indicating the operation state, information indicating power supply used, information indicating whether or not the information device is being used, and the time at which operation indicated by the operation state started. Whether or not an information device is being used is determined based on the operation state of the information device, and whether a user operation has been accepted by an input device (keyboard, mouse, or the like) provided in the information device.

The data processor 14 updates the information device table 122, based on the first power consumption information. Specifically, the data processor 14 detects a row in the information device table 122 that includes an information device ID coinciding with the information device ID included in the acquired first power consumption information. The data processor 14 updates the information in the items included in the detected row, based on the acquired first power consumption information. Regarding the history information, the data processor 14 determines whether or not the operation state has changed, based on the information indicating the operation state included in the state information. If an operation state change is detected, the data processor 14 updates the history information by appending to the history information information indicating the operation state after the change and the time of the start of that operation state.

The data processor 14, based on either information stored in the information device table 122 or the first power consumption information, updates information regarding each of the information devices and the total power and total electric energy in the zone table 121. For example, the data processor 14 reads the power consumption of the row that includes the information device ID indicating the PC 6 for each zone ID from the information device table 122. The data processor 14 calculates the total values of the read-out power consumption for each zone ID and updates the PC power in the zone table 121 with the total value, for each zone. By a similar operation, the data processor 14 updates the power and the other powers, total powers of the shared devices, and the electric energy and total electric energy of information devices in the zone table 121.

The data processor 14 may acquire the state information by requesting the state information from the information device management server 5, via the communicator 15, or may acquire the state information by periodic transmission from the information device management server 5. The data processor 14 may, each time state information is acquired as the first power consumption information, update the information device table 122 and the zone table 121, or may update the information device table 122 and the zone table 121 at some fixed period.

The communicator 15, in addition to communicating with the information device management server 5 as described above, communicates with the monitoring terminal 10. The communicator 15, in response to a request for information received from the monitoring terminal 10, reads out information stored in the power consumption database 12 and returns the information.

The facility device controller 16 controls the facility devices 4 in each zone of the building based on the detection results table 111. For example, if there is no person in zone A, the facility device controller 16 stops or reduces the operating level of facility devices 4 provided in zone A so as to reduce the power consumption. For example, if the facility device 4 is air-conditioning equipment, and performs cooling operation the operating level of the facility device 4 would be increasing the temperature of the air supplied from the air-conditioning equipment. If the facility device 4 is a lighting device, it would be extinguishing the lighting device, weakening the light emitted from the lighting device, or extinguishing the lighting device after a prescribed amount of time has elapsed without a person being detected. If the facility device 4 is an air intake/exhaust fan that circulates air or the like in the building or a water-feeding pump that supplies cooling water or hot water in the building, it would be reducing the amount of flow per unit time or switching from continuous operation to intermittent operation.

If the facility device 4 is blinds, it would be blocking sunlight from entering a room from the window, raising the heating rate, and lowering the operating level of the air-conditioning equipment, or letting sunlight enter the room from the window, raising the heating rate, and lowering the operating level of the air-conditioning equipment. Also, the lighting level by a lighting device is lowered in response to opening and closing the blinds. The facility device controller 16 may control the opening and closing of the blinds so as to suppress a change in the room temperature with respect to blinds in a zone in which no persons are present.

The facility device controller 16 acquires second power consumption information from each of the facility devices 4. The second power consumption information is information regarding the power consumed by a facility device 4. The second power consumption information includes, for example, a facility device ID, a zone ID of the zone in which the facility device 4 indicated by the facility device ID is located, the power consumption of the facility device 4, the electric energy consumption of the facility device 4, information indicating the operation state of the facility device 4, and the time at which the operation indicted by the operation state started. The facility device controller 16 updates the facility device table 123, based on the second power consumption information. Specifically, the facility device controller 16 detects a row in the facility device table 123 that includes a facility device ID coinciding with the facility device ID included in the acquired second power consumption information. The facility device controller 16 updates the information in the items included in the detected row, based on the acquired second power consumption information.

The facility device controller 16 updates the various information regarding the facility device 4 and the total power and total electric energy in the zone table 121, based on the information stored in the facility device table 123 or on the second power consumption information. For example, the facility device controller 16 reads out, for each zone ID, the power consumption in the row that includes the facility device ID indicating the air-conditioning equipment. The facility device controller 16 reads out the total value of the read-out power consumption for each zone ID and updates the power of the air-conditioning equipment in the zone table 121 with the total value, for each zone. By a similar operation, the facility device controller 16 updates the power of the lighting device, the power of the other, total power, the electric energy of the facility devices and the total electric energy in the zone table 121.

The facility device controller 16 may acquire the second power consumption information from the facility devices 4 at a predetermined period, or may acquire the second power consumption information from the facility devices 4 at each predetermined time. The facility device controller 16 may, each time second power consumption information is acquired, update the facility device table 123 and the zone table 121, or may update the facility device table 123 and the zone table 121 at some fixed period.

The power supply 17 supplies power received from an external generator or commercial power mains to the in-building database 11, the power consumption database 12, the database updater 13, the data processor 14, the communicator 15, and the facility device controller 16 provided in the energy management server 1. Even if the power supply 17 cannot receive power from the external generator or the commercial power mains, it may have a rechargeable battery or the like so that supply of power can continue.

Figure 10:
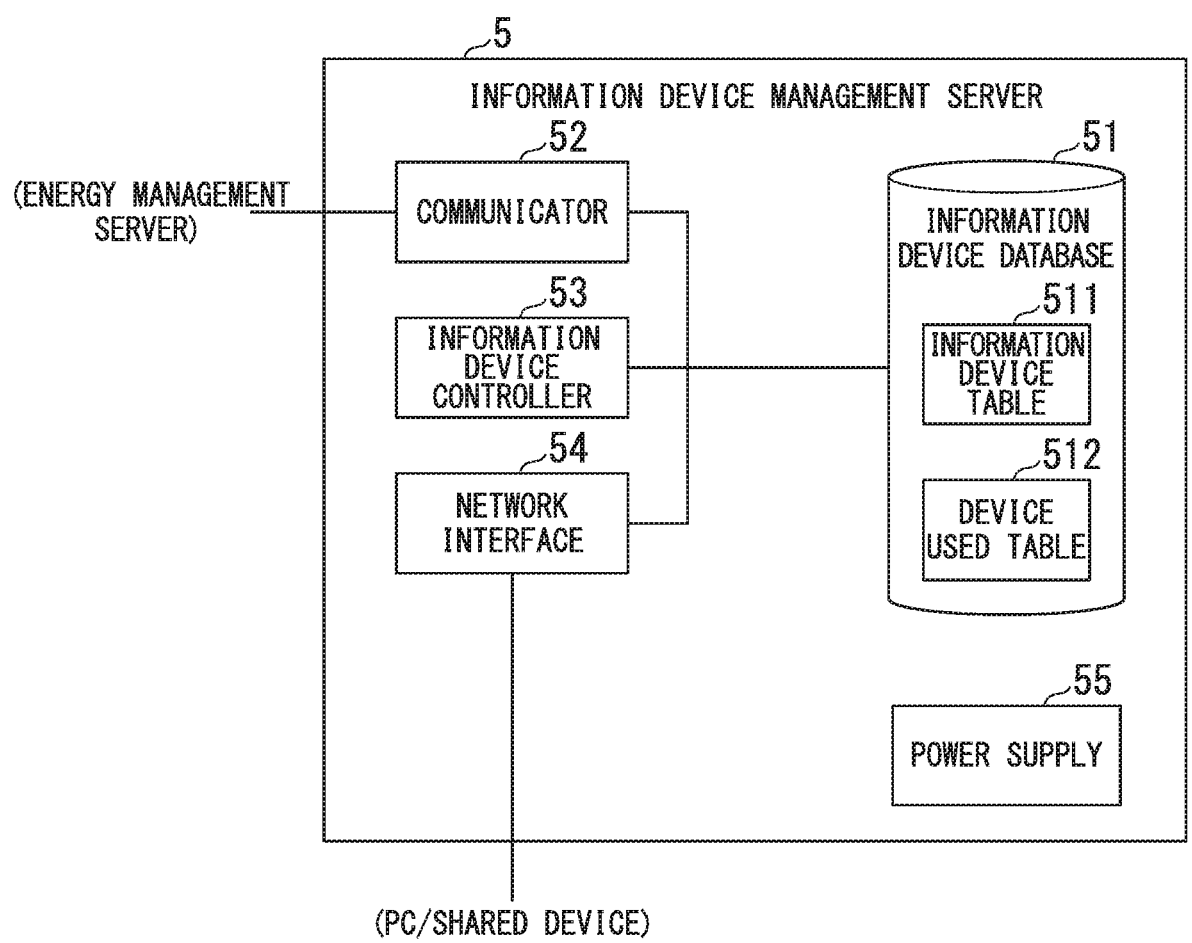
FIG. 10 is a block diagram illustrating an example of the configuration of an information device management server in the first embodiment.

FIG. 10 is a block diagram illustrating an example of the configuration of the information device management server 5 in the first embodiment. The information device management server 5 has an information device database 51, a communicator 52, an information device controller 53, a network interface 54, and a power supply 55. The information device database 51 stores an information device table 511 and a device used table 512 as information device information regarding information devices. The information device table 511 stores the zones to which the PCs 6 and the shared devices 7 belong. Specifically, it stores combinations of information device IDs that uniquely distinguish the PCs 6 and the shared devices 7 and zone IDs that indicate the zones to which the PCs 6 or shared devices 7 belong. For example, even if the PC 6 is a laptop computer that a person can carry around and use, the PC 6 belongs to some zone. For example, a laptop PC 6 is made to belong to the zone in which it is mainly used. That is, all of the PCs 6 and all of the shared devices 7 belong to some zone. The device used table 512 stores information indicating the PCs that are used by persons. Specifically, the device used table 512 stores combinations of personal IDs of persons and information device IDs that uniquely distinguish the PCs 6.

FIG. 11 illustrates an example of an information device table 511. The information device table 511 includes columns for the Information Device ID item and for the Zone ID item. Rows exist for each information device. The Information Device ID item stores an information device ID that distinguishes an information device (for example PC #1). The Zone ID item stores a zone ID indicating the zone to which the information device distinguished by the information device ID of the same row belongs. That is, the information device table 511 stores combinations of information device IDs of information devices and zone IDs of zones to which the information devices belong. For example, the information device table 511 of FIG. 11 stores that the information device distinguished as SHARED DEVICE #2 is mainly used in the zone indicated by ZONE #1. Although an example is illustrated in which there is a one-to-one correspondence between information device IDs and zone IDs in FIG. 11, a plurality of zone IDs may be associated with an information device ID.

FIG. 12 illustrates an example of the device used table 512. The device used table 512 includes columns for the Personal ID item and the Information Device ID item. Rows exist for each person entering and exiting the building. The Personal ID item stores personal IDs (for example, PERSON #1). The Information Device ID item stores information device IDs that indicate information devices used by a person identified by the personal ID in the same row. For example, the device used table 512 of FIG. 12 stores that the person distinguished as PERSON #1 uses the information device distinguished as PC fit. Although an example has been illustrated in which there is a one-to-one correspondence between the personal IDs and the information device IDs in FIG. 12, if a person uses a plurality of information devices, a plurality of information device IDs may be associated with a personal ID.

Returning now to FIG. 10, the description of the information device management server 5 will be continued. The communicator 52 communicates with the energy management server 1. The communicator 52 receives the collection results as data transmitted from the energy management server 1, and outputs the collection results to the information device controller 53. The information device controller 53, based on the information device table 511 and the device used table 512 stored in the information device database 51, and collection results as data, selects a PC 6 or a shared device 7 as a target for reduction of power consumption. The information device controller 53 controls the selected PC 6 or shared device 7 so as to suppress the power consumed by the PC 6 or the shared device 7. For example, the information device controller 53 transmits to the PC 6 and the shared device 7 belonging to a zone in which there are no persons control information that includes an instruction to change the operation state to off or sleeping.

The information device controller 53 acquires, via the network interface 54, state information from each of the information devices that are the PCs 6 and the shared devices 7. The information device controller 53 transmits the acquired state information to the energy management server 1, via the communicator 52. The information device controller 53, at a predetermined period or time, transmits a request to each of the information devices that are the PCs 6 and shared devices 7 to transit the state information and acquires the state information returned as a response. The information device controller 53 may acquire state information transmitted from the information devices that are the PCs 6 and the shared devices 7 at a fixed period via the network interface 54. There are cases in which a slopped PC 6 or a shared device 7 for which the operation state is off cannot make a response to the information device controller 53 with respect to a request from the information device controller 53. In such cases, the information device controller 53 treats the operation state of the PC 6 or shared device 7 information device from which a response has not been obtained as being off and generates the state information of the information device and transmits it to the energy management server 1.

The network interface 54 communicates with PCs 6 and shared devices 7 located inside the building. The network interface 54 transmits the control information generated by the information device controller 53 to a PC 6 or a shared device 7. The network interface 54 receives state information from the PC 6 or the shared device 7 that is the control target and makes a request to the communicator 52 to transmit the received state information to the energy management server 1.

The power supply 55 supplies power received from an external generator or commercial power mains to the information device database 51, the communicator 52, the information device controller 53, and the network interface 54 of the information device management server 5. Similar to the power supply 17 provided in the energy management server 1, the power supply 55 may have a rechargeable battery or the like, so that the supply of power can be continued even if the power supply 55 cannot receive power from the external generator or the commercial power mains.

Figure 13:
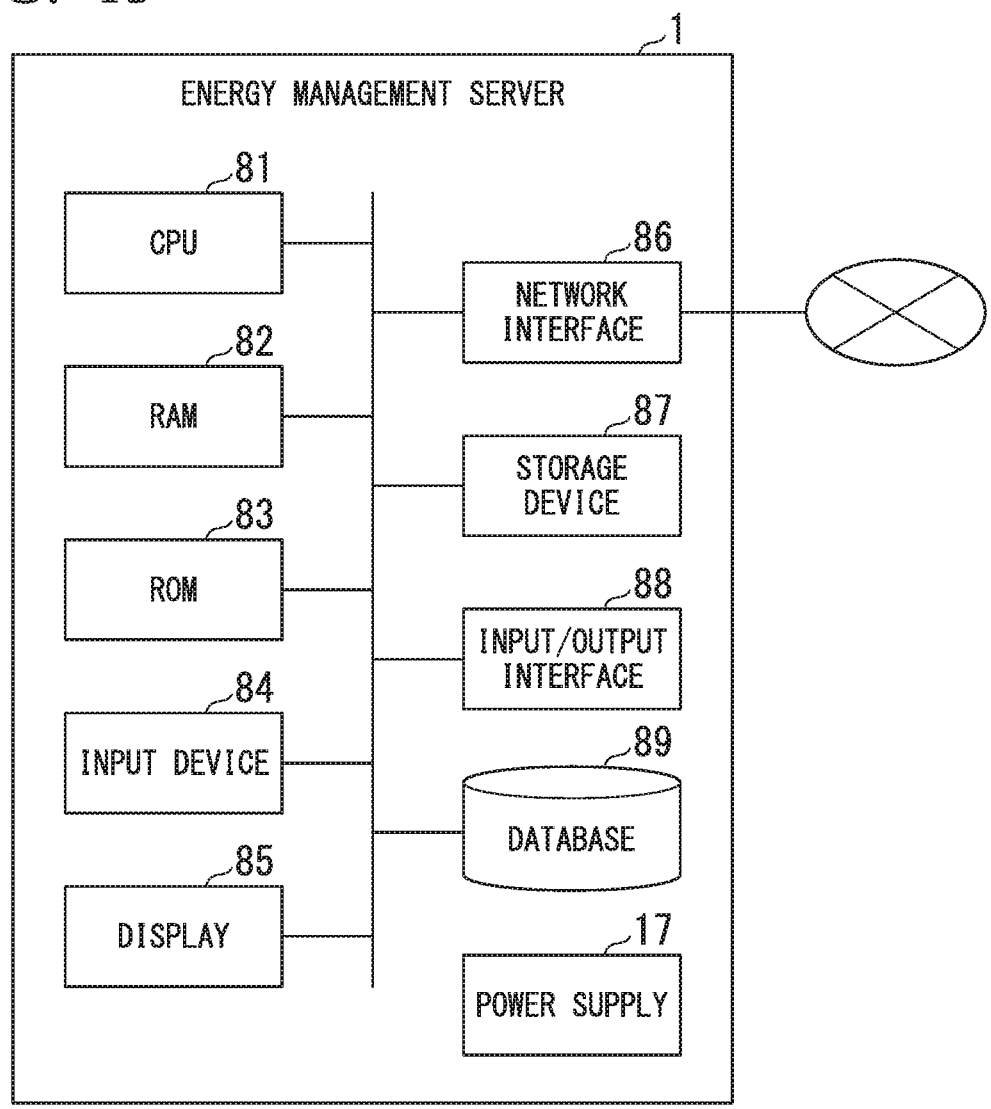
FIG. 13 is a block diagram illustrating an example of the hardware configuration of an energy management server in the first embodiment.

FIG. 13 is a block diagram illustrating an example of the hardware configuration of the energy management server 1. The energy management server 1 has a CPU 81, a RAM 82, a ROM 83, an input device 84, a display 85, a network interface 86, a storage device 87, an input/output interface 88, a database 89, and a power supply 17. The CPU 81 reads out a program stored non-temporarily in the storage device 87, which is constituted by a HDD or SSD (solid-state drive), or in the ROM 83 into the RAM 82, and executes the read-out program. The CPU 81, by executing processing in response to operation by a user or administrator input to the input device 84, such as a mouse or keyboard, operates as the database updater 13, the data processor 14, and the facility device controller 16. The network interface 86 operates as the communicator 15. The database 89 operates as the in-building database 11 and the power consumption database 12.

The CPU 81, via the input/output interface 88, acquires entry/exit information from the entry-exit management system 2 and acquires presence-absence information from each of the detection sensors 3. The CPU 81 operating as the database updater 13, based on the acquired entry-exit information and presence-absence information, updates the information stored in the database 89 operating as the in-building database 11. The CPU 81 operating as the data processor 14 collects information stored in the database 89 operating as the in-building database 11 and the power consumption database 12. The network interface 86 operating as the communicator 15 transmits the collection results obtained by the collection to the information device management server 5.

The CPU 81 operating as the data processor 14 and the facility device controller 16 acquires the first and second power consumption information. Based on the first and second power consumption information, the CPU 81 updates the information stored in the database 89 operating as the power consumption database 12. The display 85 displays information of the power consumption database 12 included in the database 89. The display 85, for example, displays the zone table 121, the information device table 122, and the facility device table 123 illustrated in FIG. 7, FIG. 8, and FIG. 9. By displaying for each zone the power consumed by the facility devices and the information devices, the energy management server 1 enables monitoring of the power consumed by all devices related to the building. In this manner, the energy management server 1 may be implemented by hardware having the CPU 81 that executes a program.

Similar to the energy management server 1, the information device management server 5 may be implemented by hardware having a CPU dial executes a program. In that case, the CPU 81 operates as the information device controller 53, by executing processing in response to an operation by a user or administrator input to the input device 84 such as a mouse or keyboard.

Figure 14:
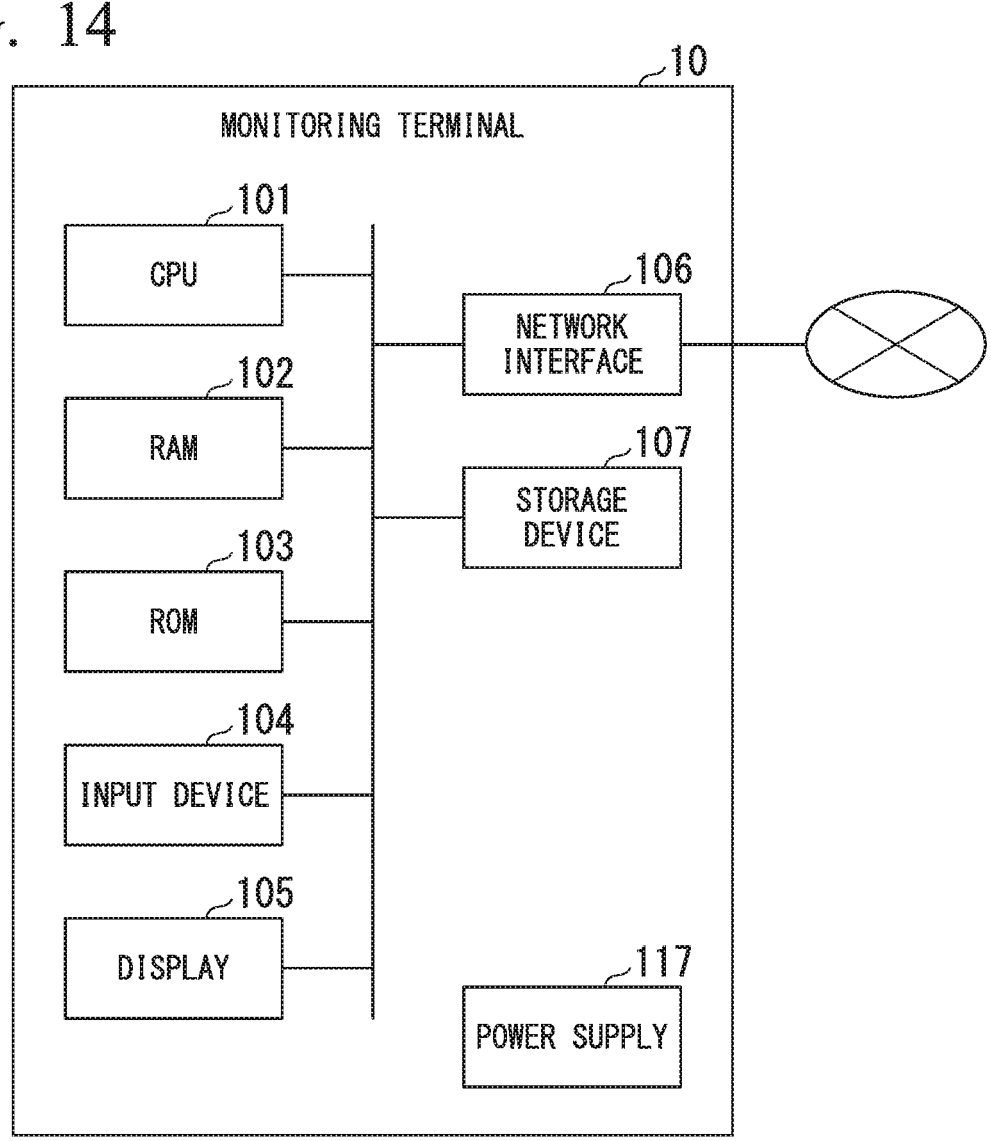
FIG. 14 is a block diagram illustrating an example of the hardware configuration of a monitoring terminal in the first embodiment.

FIG. 14 is a block diagram illustrating an example of the hardware configuration of the monitoring terminal 10. The monitoring terminal 10 has a CPU 101, a RAM 102, a ROM 103, an input device 104, a display 105, a network interface 106, a storage device 107, and a power supply 117. The CPU 101 reads out a program stored non-temporarily in the storage device 107 constituted by a HDD or SSD or in the ROM 103 into the RAM 102, and executes the read-out program. Based on the program, the CPU 101 executes processing in response to operation by an administrator input to the input device 104 such as a mouse or keyboard. Specifically, the CPU 101 makes a request to the energy management server 1 for information stored in the in-building database 11 or the power consumption database 12, and causes display on the display 105 of the information obtained as a response.

The display 105 displays a screen based on a program executed by the CPU 101. For example, the display 105 displays information stored in the in-building database 11 or the power consumption database 12. The display 105 displays, for example, the zone table 121, the information device table 122, and the facility device table 123 illustrated in FIG. 7, FIG. 8, and FIG. 9. The display 105 may display the detection results table 111 and the entry-exit table 112 stored in the in-building database 11. The network interface 106 communicates with the energy management server 1 in response to an instruction from the CPU 101. Based on an instruction from the CPU 101, the network interface 106 transmits an information request to the energy management server 1 and receives a response to the request from the energy management server 1.

The power supply 117 supplies power received from an external generator or commercial power mains to CPU 101, the RAM 102, the ROM 103, the input device 104, the display 105, the network interface 106, and the storage device 107 provided in the monitoring terminal 10. The power supply 117 may have a rechargeable battery or the like, so that the supply of power can be continued even if the power supply 117 cannot receive power from the external generator or the commercial power mains.

The monitoring terminal 10, in addition to making a request to the energy management server 1 for information stored in the in-building database 11 or the power consumption database 12, may request updating of information stored in power consumption database 12. If a request for updating of information is made from the monitoring terminal 10, in the energy management server 1, the data processor 14 acquires the first power consumption information of each of the information devices from the information device management server 5 and updates the information stored in the zone table 121 and the information device table 122. The facility device controller 16 acquires the second power consumption information from each of the facility devices 4 and updates the information stored in the zone table 121 and the information device table 122.

A PC 6 in the building may perform the same operation as that of the monitoring terminal 10. For example, for a person using a PC 6 in the building to confirm the power consumed in the building, the user may operate the PC 6 to make a request to the energy management server 1 for information stored in the power consumption database 12. By displaying the zone table 121, the information device table 122, and the facility device table 123 acquired from the energy management server 1 on the PC 6, the person using the PC 6 can confirm the power consumed in the building. In the monitoring terminal 10 und the PC 6, when displaying information regarding the power consumption related to the building, a graph or table generated based on information of the zone table 121, the information device table 122, and the facility device table 123 may be displayed on the monitoring terminal 10 or the PC 6.

Figure 15:
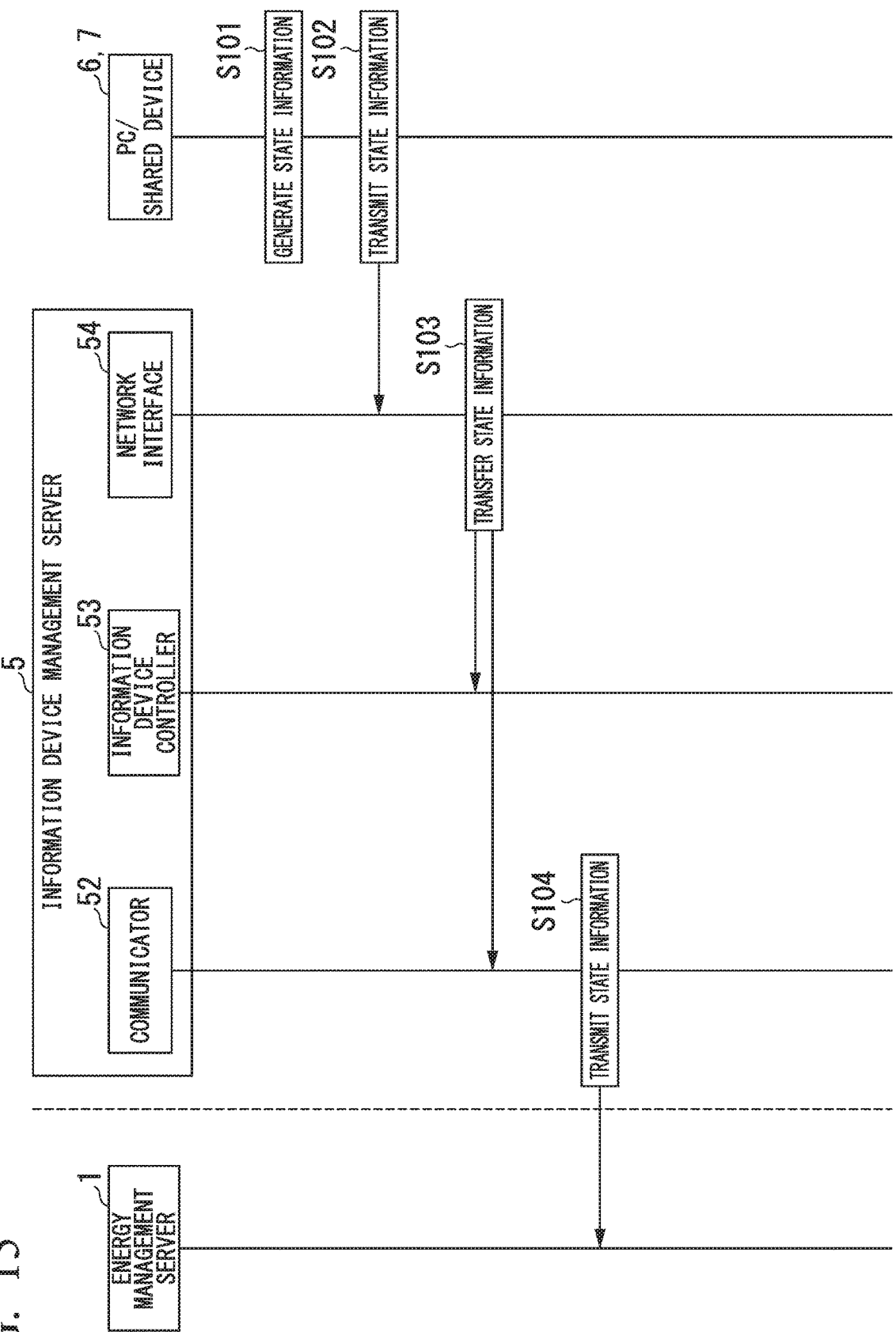
FIG. 15 is a first sequence diagram illustrating the operation in the overall management system of the first embodiment.
Figure 16:
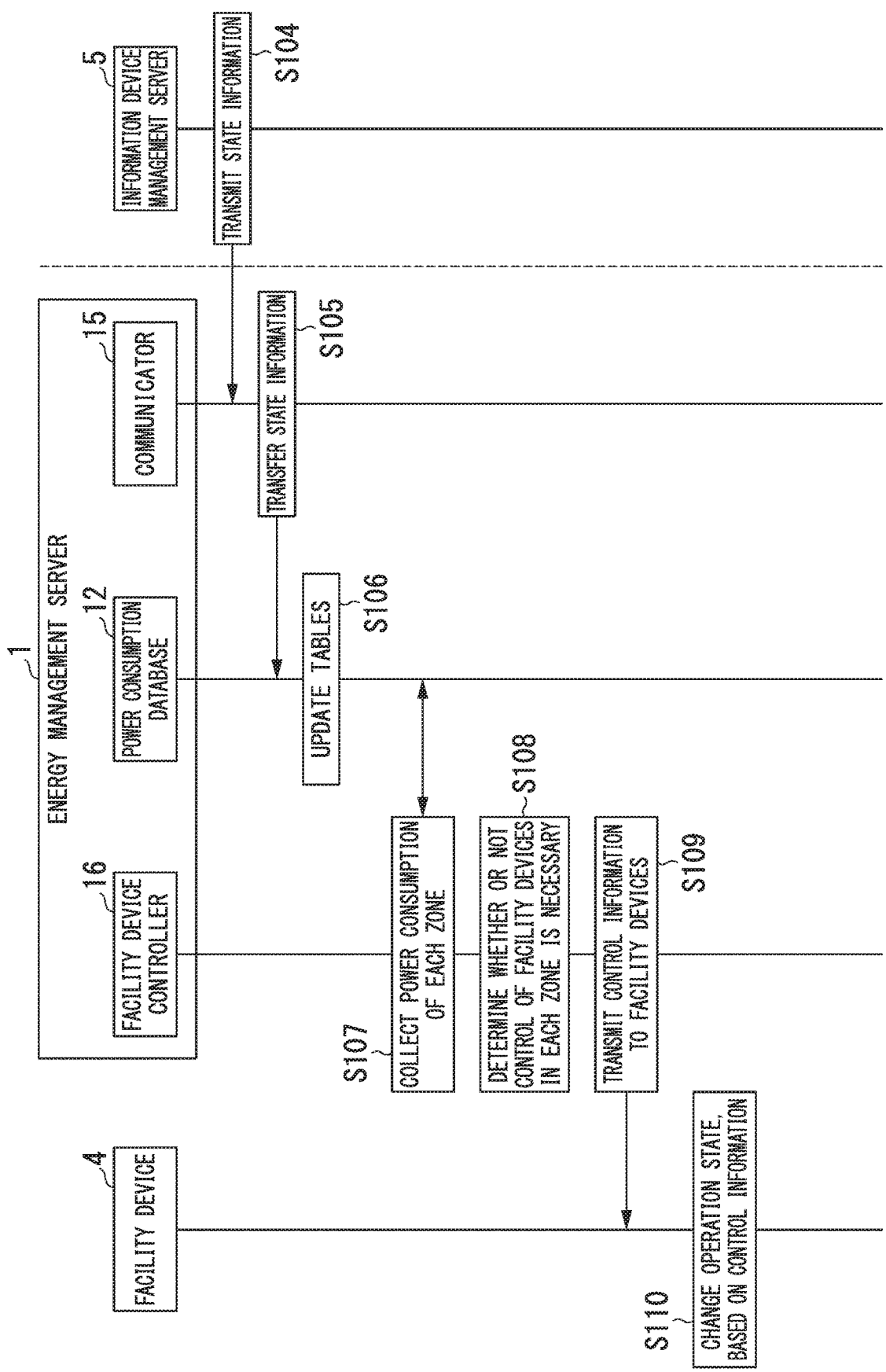
FIG. 16 is a second sequence diagram illustrating the operation in the overall management system of the first embodiment.

The operation of the overall management system of the first embodiment will now be described, with references made to FIG. 15 and FIG. 16. FIG. 15 and FIG. 16 are sequence diagrams illustrating the processing for the information device management server 5 to transmit the acquired state information to the energy management server 1, and for the energy management server 1 to update the power consumption database 12 and to control the facility device 4 based on the state information as the first power consumption information.

A PC 6 or a shared device 7 generates state information regarding the power that itself consumes (step S101). The generation of the state information by the PC 6 or the shared device 7 may be performed upon receiving a request by the information device management server 5, or may be performed at a pre-established period or time. The PC 6 or shared device 7 may generate the state information upon receiving an operation by a person. The PC 6 or shared device 7 transmits the state information to the information device management server 5 (step S102).

In the information device management server 5, the network interface 54 transfers the state information received from the PC 6 or the shared device 7 to the information device controller 53 and the communicator 52 (step S103). The communicator 52 transmits the state information to the energy management server 1 via the network interface 54 (step S104). The communicator 52 may group a plurality of state information that are obtained from a plurality of PCs 6 and shared devices 7 and temporarily stored and transmit them to the energy management server 1, or may transmit to the energy management server 1 each time state information is obtained.

If the state information transmitted from the information device that is a PC 6 or a shared device 7 does not include a zone ID of the zone to which the information device belongs, the information device controller 53 performs processing to append the zone ID to the state information received, via the network interface 54. The information device controller 53 acquires from the information device table 511 the zone ID corresponding to the information device ID included in the state information and appends the acquired zone ID to the state information. The information device controller 53 transmits the state information that includes the zone ID to the energy management server 1 via the communicator 52. When the information device controller 53 is to send the state information to the energy management server 1, it is not necessary to transfer the state information to the communicator 52 from the network interface 54.

In the energy management server 1, the communicator 15 transfers to the data processor 14 the state information received from the information device management servers (step S105). The data processor 14, based on the state information, updates the information device table 122 and the zone table 121 stored in the power consumption database 12 (step S106). The facility device controller 16 collects power consumption information of the facility devices 4 stored in the zone table 121 (step S107). The collection by the facility device controller 16 includes, for example, detecting, based on the power consumption information, zones in which information devices are not being used, calculating for each zone the proportion of the power consumption in the zone that is consumed by the facility devices 4, and calculating the ratio of power consumption between the facility devices 4 and the information devices related to the building.

Based on the collection results, the facility device controller 16 determines for each zone whether or not control is required with respect to the facility devices 4 (step S108). For example, a determination is made as to whether or not there is a facility device 4 operating in a zone in which an information device is not being used. If there is a facility device 4 operating in such as zone, the facility device controller 16 transmits control information that includes an instruction to slop or lower the operating level to the facility device 4 operating in that zone (step S109). The facility device 4 that has received the control information changes the operation state (step S110).

A zone in which an information device such as a PC 6 and a shared device 7 or the like is not operating is, for example, a zone in which the total value of power consumption of the PCs 6 and shared devices 7 is less than a certain value, and a zone that is determined, based on presence-absence information, that no person is using. The energy management server 1, based on the operation state of the PCs 6 and the shared devices 7 controlled by the information device management server 5, can reduce the power consumption without sacrificing a person's convenience, by stopping or reducing the operating level of facility devices 4 in the zone.

According to the management system of the first embodiment, the energy management server 1 acquires and stores the power consumed by each information device and facility device 4 in the building. Because the energy management server 1 collects the power consumptions of each information devices and facility device 4 for each of a plurality of zones in the building, it can monitor the power consumption in the building. By the energy management server 1 performing control to suppress the power consumed by facility devices 4 based on the power consumption by zones, it is possible to reduce the power consumption.

The facility device controller 16 may detect a zone in which the power consumed by information devices is above a certain value and perform control to suppress the power consumed by the facility devices 4 in the detected zone. By this control, the management system is able to suppress the total power consumption in the zone and to suppress the power consumption in the overall building.

The data processor 14 may detect a zone in which a person is present, based on the detection results table 111, and make a request to information device management server 5 for state information regarding the information devices in the detected zone. By acquiring state information of the information devices in a zone in which persons are present and updating the power consumption database 12 by the data processor 14, it is possible to increase the frequency of updating the power consumption information of zones estimated to have a high power consumption by information devices, and to improve the real-time response of monitoring of the power consumption.

The configuration described has been one in which the history information of the information devices in the information device table 122 is updated by the data processor 14 based on the state information. However, the PCs 6 and the shared devices 7 may each generate history information themselves and transmit state information that includes the history information to the information device management server 5 and the energy management server 1. If the PCs 6 and the shared devices 7 each generate history information themselves, each time the operation state changes, the operation state after the change and the current time are stored in combination. The time series of the combinations of operation state after changes and the current times are the history information for each of the information devices.

In the first embodiment, the description has been for a configuration in which, in the energy management server 1, the database updater 13 stores presence-absence information obtained from the sensors into the detection results table 111, and the data processor 14 collects information stored in the detection results table 111 and transmits the obtained data to the information device management server 5. However, the energy management server 1 may transmit to the information device management server 5 presence-absence information obtained from each detection sensor 3. If the information device management server 5 receives presence-absence information, a sensor table into which are stored the combination of a sensor ID that uniquely distinguishes a detection sensor 3 and the information device ID of an information device located in the person-detection range of the detection sensor 3 may be stored into the information device database 51. By having a sensor table, the information device management server 5 can control the information devices based on the presence-absence information.

Figure 17:
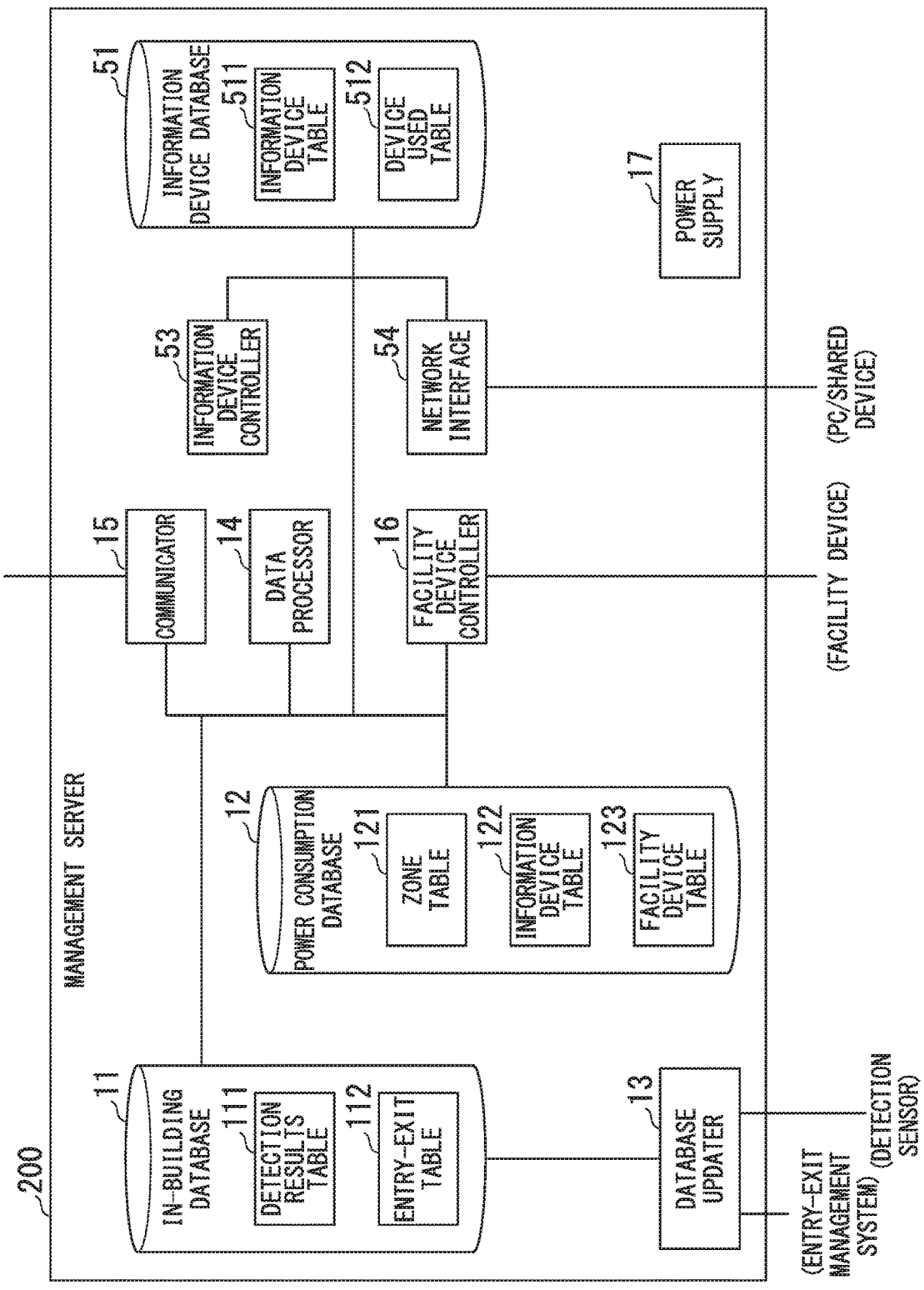
FIG. 17 is a block diagram illustrating another example of the configuration of the management system of the first embodiment.

The management system according to the first embodiment may have one management server 200 in place of the two servers of the energy management server 1 and the information device management server 5. FIG. 17 is a block diagram illustrating another example of the configuration of the management system in the first embodiment. The management server 200 have an in-building database 11, and a power consumption database 12, a database updater 13, a data processor 14, a communicator 15, a facility device controller 16, a power supply 17, an information device database 51, an information device controller 53, and a network interface 54. By configuring the energy management serve 1 and the information device management server 5 as one server, the communicator 52 for communicating between the energy management server 1 and the information device management server 5 is omitted. The power supply 55 is also omitted. By using the management server 200, processing performed by the energy management server 1 and the information device management server 5 may be performed by one server.

[Second Embodiment]

Figure 18:
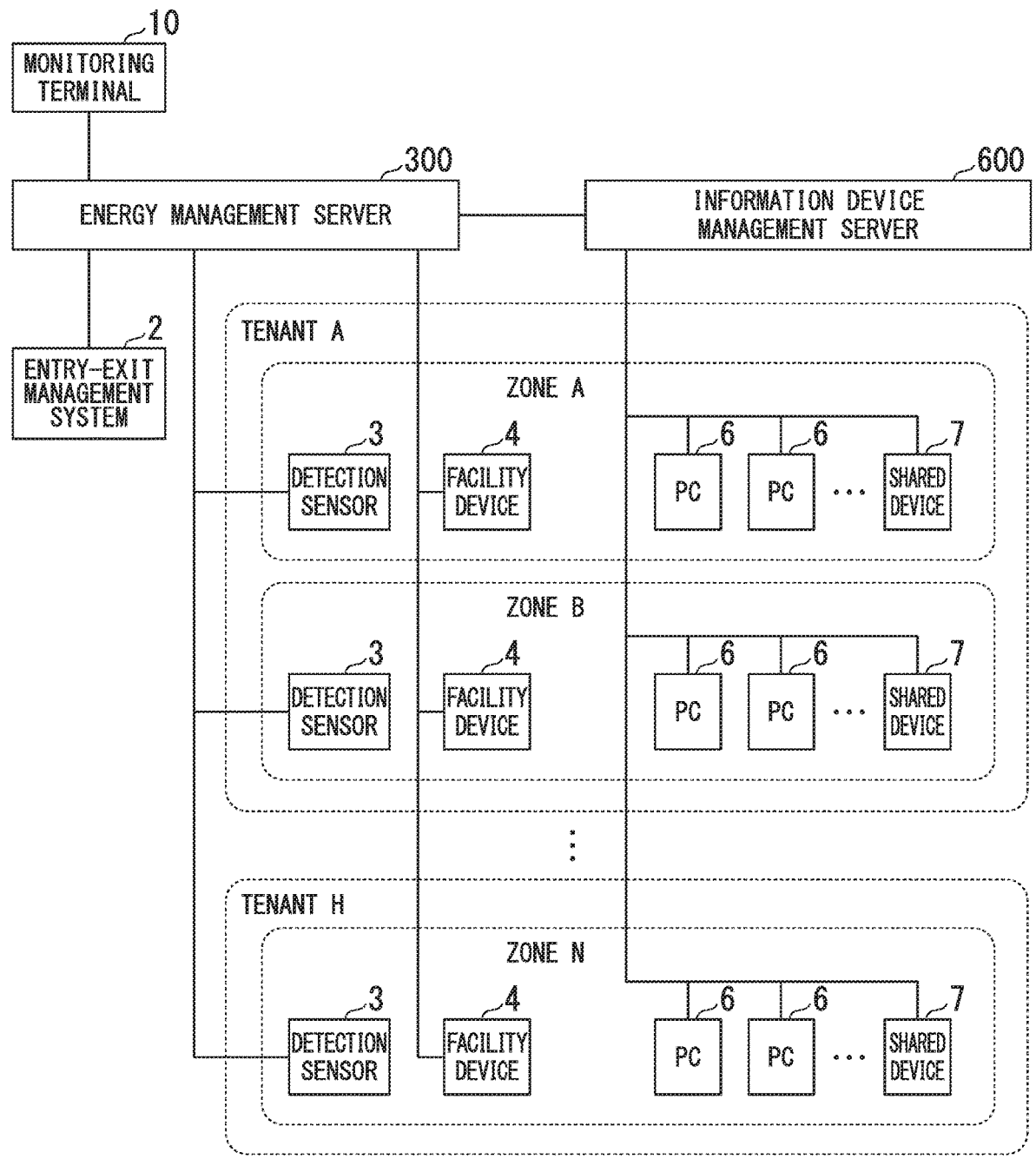
FIG. 18 is a block diagram illustrating an example of the configuration of a management system in a second embodiment.

FIG. 18 is a block diagram illustrating an example of the configuration of a management system of a first embodiment. The management system monitors the energy consumed by facility devices provided in a building and the energy consumed by at least one information device used in the building. The following description has been for the case where the building is an office building and a plurality of tenants exist in the office building.

The management system according to the second embodiment has an energy management server 300, an entry-exit management system 2, a plurality of detection sensors 3, a plurality of facility devices 4, and information device management server 600. The energy management server 300 may be provided in a building that is targeted for energy reduction by the management system, or may be provided in a different location. If the energy management server 300 is provided in a location different from the building, the energy management server 300 communicates with an entry-exit management system 2, and a detection sensor 3 and facility device 4 provided in the building, via a network consulted using one or both of a cable n or a wireless network. The information device management server 600, similar to the energy management server 1, may be provided in the building or in a location different from the building. One or both of the energy management server 300 and the information device management server 600 may be constituted using cloud computing. The building that is the target of energy reduction by the management system may be multiple, may be a group of a plurality of office buildings, or may be a plurality of buildings constructed in some region.

The energy management server 300 acquires entry-exit information regarding entering and exiting the building from the entry-exit management system 2. The entry-exit management system 2 detects a person entering the building that is being managed and a person exiting from the building, and generates entry-exit information based on the detection result. The energy management server 300 acquires detection signals related to the defection of persons from each of a plurality of detection sensor 3 provided within the building. In the following, the detection signal will be referred to as presence-absence information. The detection sensors 3 are provided in each of a plurality of zones regarding the building. Each of the detection sensors 3 determines the presence or absence of a person or persons in the zone, and generates presence-absence information based on the determination result. The presence-absence information includes a zone ID that uniquely identifies a zone and information that indicates the presence or absence of a person or persons in that zone. A detection sensor 3 has, for example, an image sensor or an infrared sensor, and detects the presence-absence or the movement of a person or persons, based on the output from the sensor. If the detection accuracy of the detection sensor 3 is high and can detect the number of persons, the detection sensor 3 may notify the energy management server 300 of presence-absence information that indicates the number of persons, rather than the presence-absence of a person or persons. The presence-absence information is also referred as presence information.

Zones in the second embodiment are established based on the sections lent to tenants. For example, the floor of each floor in the building may be divided into a plurality of sections, and each section may be defined as a zone. The zone may also be established based on a policy of energy reduction.

The energy management server 300 controls the facility devices 4 provided in each zone, based on entry-exit information acquired from the entry-exit management system 2 and the presence-absence information acquired from the detection sensors 3. The facility devices 4 are provided in the building, for which the consumed electrical power changes directly or indirectly in response to the operation state. A facility device 4 is, for example, a light device or air-conditioning equipment, an air intake or exhaust fan, a water-feed pump, a hot-water supplier, or blinds provided at a window. Although blinds are not a device that constantly consumes energy, the amount of sunlight from the window is changed by opening and closing the blinds, thereby indirectly changing the power consumed by air-conditioning equipment and the like.

The energy management server 300 collects the entry information and the presence-absence information and transmits data obtained by collecting to the information device management server 600 as collection results. The energy management server 300 acquires the first power consumption information regarding power consumed by the information devices controlled by the information device management server 600. The energy management server 300 acquires the second power consumption information regarding the power consumed by the facility devices. The energy management server 300 stores the first and second power consumption information in associated with zones, based on the entry-exit information and the presence-absence information.

The monitoring terminal 10 is connected to the energy management server 300 to enable communication. The monitoring terminal 10 acquires and displays information stored in the energy management server 300, based on the first and second power consumption information. The monitoring terminal 10 is, for example, is used by an administrator of the building. By operating the monitoring terminal 10, the administrator causes display on the monitoring terminal 10 and can verify and monitor the power consumption related to the building. Although FIG. 18 illustrates on example of a management system having one monitoring terminal 10, the management system may have a plurality of monitoring terminals 10. The monitoring terminal 10 may be provided in the same location as the energy management server 300, or at a different location. If the energy management server 300 is implemented by using cloud computing, the monitoring terminal 10 acquires and displays information by accessing computing resources that constitute the energy management server 300, via a network.

The energy management server 300 and the information device management server 600 are connected to enable communication. The energy management server 300 and the information device management server 600 may be connected by a dedicated network or a local area network, or may be connected via the Internet. If the energy management server 300 and the information device management server 600 communicate via the Internet, the energy management server 300 and the information device management server 600 may use a VPN (virtual private network) to communicate.

The information device management server 600 acquires the presence-absence of a person in each zone in the building and the entry and exit to and from the building from the collection results. The information device management server 600, based on information regarding persons in each zone, controls the information devices belonging to each zone and reduces the power consumed by the information devices in the building. An information device is a PC 6 or shared device 7 used by a person or persons. The PC 6 is a laptop or a desktop computer. A shared device 7 is a primer, a copier, a multifunction printer, a hub enabling communication between computers, a network device such as a switch or wireless LAN access point, or a device shared by a plurality of persons, such as an IP telephone. The information device management server 600 acquires information indicating the power or electric energy consumed by the PCs 6 and the shared devices 7 and transmits the acquired information to the energy management server 300. At least one defection sensor 3 and one or a plurality of facility devices 4 are provided in each zone of the building. At least one or both of a PC 6 and shared device 7 belong to each zone of the building. The information device management server 600 and the PCs 6 and shared devices 7 may be connected by a dedicated network or a local area network, or may be connected via the Internet. If the information device management server 600 and the PCs 6 and shared devices 7 communicate via the Internet, the information device management server 600 and the PCs 6 and shared devices 7 may use a VPN to communicate.

Figures 19, 20:
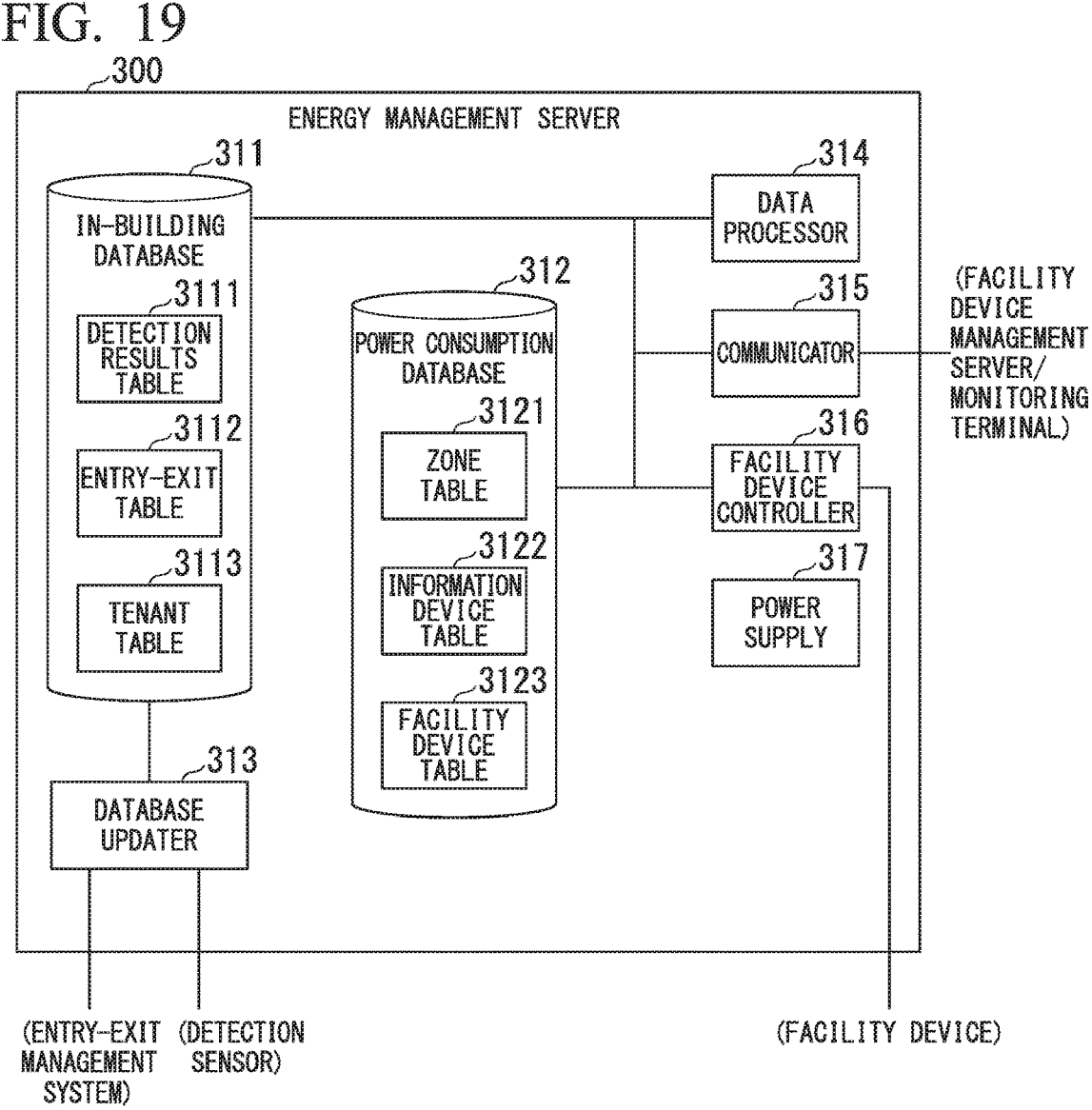
FIG. 19 is a block diagram illustrating an example of the configuration of an energy management server in the second embodiment.
FIG. 20 illustrates an example of a detection results table in the second embodiment.

FIG. 19 is a block diagram illustrating an example of the configuration of the energy management server 300 in the second embodiment. The energy management server 300 has an in-building database 311, a power consumption database 312, a database updater 313, a data processor 314, a communicator 315, a facility device controller 316, and a power supply 317. The in-building database 311 stores, as information regarding persons in the building, a detection results table 3111, an entry-exit table 3112, and a tenant table 3113. The detection results table 3111 stores the presence/absence of persons in each zone. The entry-exit table 3112 stores the state of entry-exit for each person using the building or the presence or absence of a person in the building. The tenant table 3113 stores information indicating a zone rented by each tenant. Hereinafter, the zone rented by the tenant is also referred as a zone belonging to the tenant or a zone used for the tenant. The power consumption database 312 stores a zone table 3121, an information device table 3122, and a facility device table 3123. The zone table 3121 stores, for each zone, information regarding the power consumption of information devices such as facility device 4, the PCs 6, and the shared devices 7. The information device table 3122 sores, for each information device, information regarding the power consumption of information devices such as the PCs 6 and the shared devices 7. The facility device table 3123 stores, for each facility device 4, information regarding the power consumption of the facility device 4.

FIG. 20 illustrates an example of the detection results table 3111 in the second embodiment. The detection results table 3111 includes columns for the Zone ID item and the Person Present/Absent item for persons. Rows exist for each zone. The Zone ID item stores a zone ID that uniquely distinguishes a zone (for example, ZONE #1). The Person Present/Absent item stores whether a person is present or absent in the zone indicated by the zone ID in the same row. Present indicates that at least one person is detected. Absent indicates that no person is detected. For example, the detection results table 3111 in FIG. 20 stores that a person is absent from the zone indicated by ZONE #2. Although the detection results table 3111 in FIG. 20 is an example of columns having the two items Zone ID and Person Present/Absent, the detection results table 3111 may include columns of other items. For example, a Time column of the time that the Person Present/Absent item was updated, and a column of the number of persons when the detection sensor 3 can detect the number of persons may be included.

FIG. 21 illustrates an example of the entry-exit table 3112 in the second embodiment. The entry-exit table 3112 includes columns for Personal ID items, Tenant ID items and for the State items of entry-exit. Rows exist for each individual person who enters and exits the building. The Personal ID item stores a personal ID that uniquely distinguishes a person (for example PERSON #1) who enters and exits the building. The Tenant ID item stores a tenant ID that uniquely identifies a tenant to which a person indicated by the personal ID of the same row belongs. The State item of the entry-exit state stores whether a person indicated by the personal ID of the same row is in the building or has already exited the building, with "IN BUILDING", and "EXITED BUILDING". For example, the entry-exit table 3112 of FIG. 21 stores that the person distinguished by PERSON #2 and belonging to the tenant indicated by TENANT #1 is currently in the building. Although the entry table 3112 as the example illustrated in FIG. 21 has columns of the three items indicating the personal ID, the tenant ID and the entry-exit state, the entry-exit table may include columns of other items. For example, it may include a column of the time at which the entry/exit-exit state was updated.

FIG. 22 illustrates an example of the tenant table 3113. The tenant table 3113 includes columns for Zone ID item and for Tenant ID item. Rows exist for each zone in the building. The Zone ID item stores a zone ID that uniquely distinguishes a zone (for example ZONE #2). The Tenant ID item stores a tenant ID that uniquely identifies a tenant (for example TENANT #1) using the zone indicated by the zone ID of the same row. For example, the tenant table 3113 of FIG. 22 stores that the zone distinguished by ZONE #2 belongs to the tenant indicated by TENANT #1. A tenant uses at least one zone.

Figure 23:
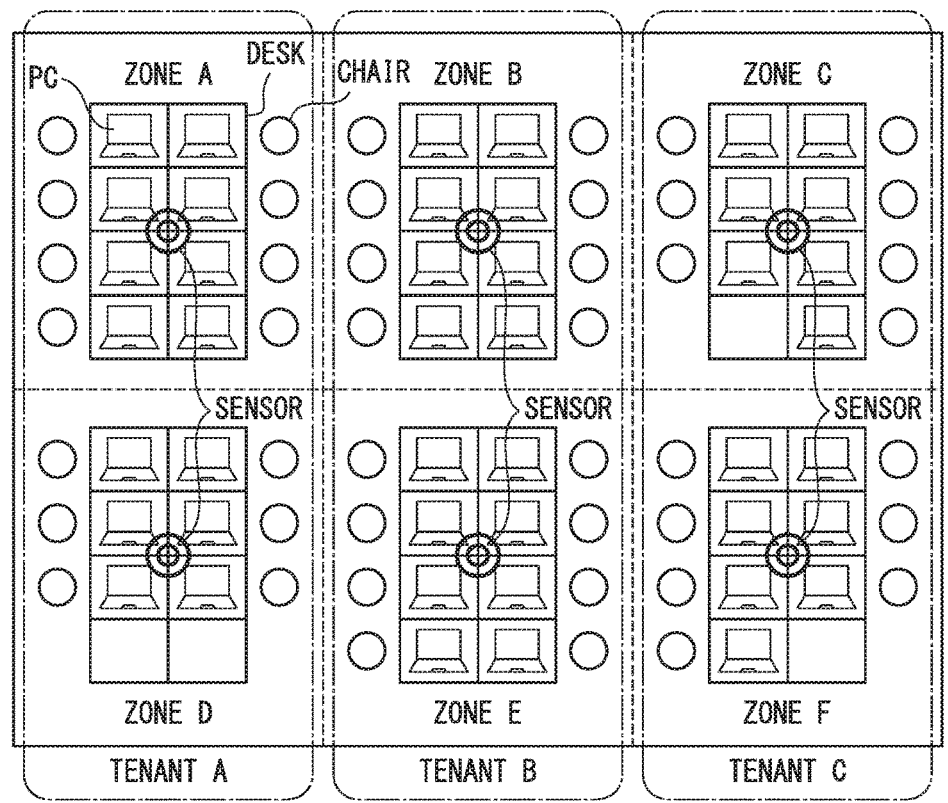
FIG. 23 is a first drawing illustrating an example of zones in a building in the second embodiment.
Figure 24:
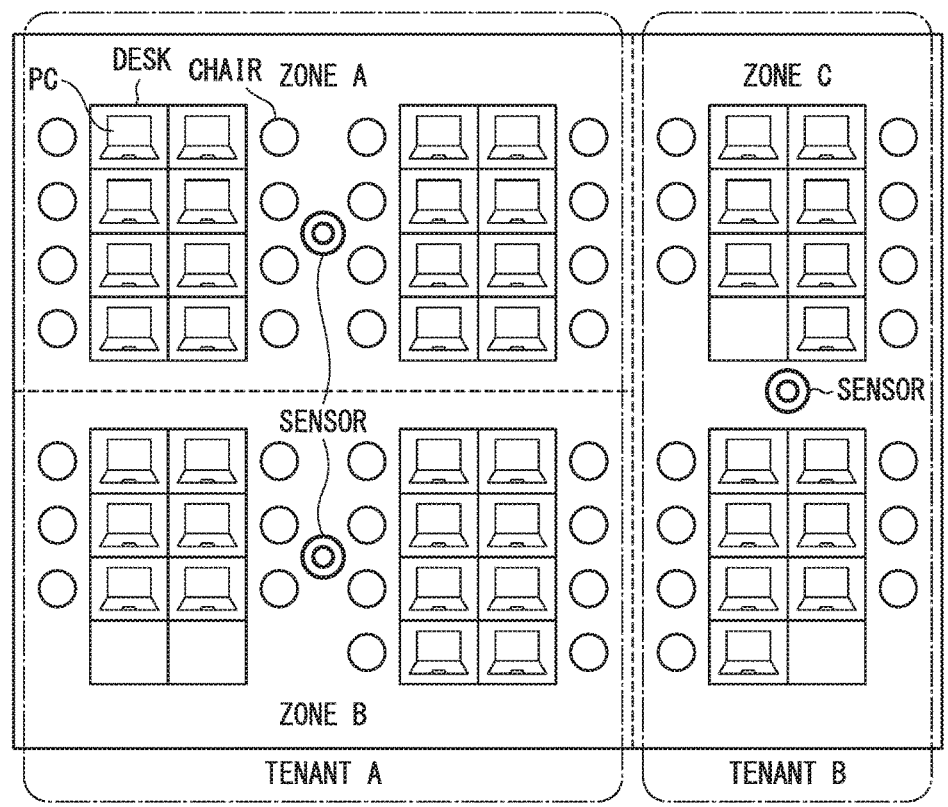
FIG. 24 is a second drawing illustrating an example of zones in a building in the second embodiment.

The zones into which the region inside a building is divided will be described. FIG. 23 and FIG. 24 illustrate examples of zones in the building. In the example illustrated in FIG. 23, one floor in the building is divided into six zones and three tenants use two zones, respectively. FIG. 23 illustrates the case where the tenant A uses the zones A and D, the tenant B uses the zones B and E, and the tenant C uses the zones C and F. The detection sensors 3 for detecting a person is provided in each zone. The detection sensors 3 are, for example, mounted to the ceiling and sense the presence or absence of persons in each zone.

In the example illustrated in FIG. 24, one floor in the building is divided into three zones and two tenants use zones. FIG. 24 illustrates the case where the tenant A uses the zones A and B, and the tenant is uses the zone C. The detection sensors 3 for detecting a person is provided in each zone. The detection sensors 3 are, for example, mounted to the ceiling and sense the presence or absence of persons in each zone. The detection range of the detection sensors 3 in the example illustrated in FIG. 24 is wider than the detection range of the detection sensors 3 in the example illustrated in FIG. 23.

FIG. 25 illustrates an example of a zone table 3121 in the second embodiment. The zone table 3121 stores, for each zone, the power consumption and the electric energy consumption within the building. The power consumption and the electric energy consumption for each zone are divided for storage, between the power consumption and the electric energy consumption of the facility devices 4, and the power consumption and the electric energy consumption of the information devices such as the PCs 6 and the shared devices 7 controlled by the information device management server 600. The zone table 3121 includes columns for each of the items of the zone IDs, the power of the information devices including PCs and shared devices, the power of facility devices including air-conditioning equipment and lighting devices, the total power, the electric energy of the information devices, the electric energy of the facility devices, and the total electric energy. Rows exist for each of the zones. The zone IDs are stored in the Zone ID items. The Information Device Power item includes items for PCs and shared devices and the like included in the information devices, and the values of the power consumed by PCs and shared devices and the like is stored therein. The facility device power item includes items for the air-conditioning equipment and lighting devices included in the facility devices, and the values of the power consumed by the air-conditioning equipment and light devices and the like is stored therein. The Total Power items stores total values of power consumed by the information devices and facility devices provided in the building. The Information Device Electric Energy item stores the value of the electric energy consumed by information devices in a period of time that is the collection unit. The Facility Device Electric Energy item stores the values of the electric energy consumed by facility devices in a period of time that is the collection unit.

Although in the zone table 3121 illustrated in FIG. 25 the information devices are divided into PCs, shared devices, and other, other items may be included in the information devices. Also, although the facility devices are divided into air-conditioning equipment, lighting devices, and other, other items may be included in the facility devices. The values of power consumed by PCs and shared devices in the zone table 3121, rather than being the value of the total of the power consumption of the PCs and shared devices belonging to a zone, may be the values of power consumed by the individual PCs or shared devices. The electric energy of the information devices and of the facility devices and the total electric energy may be stored as a plurality of power amounts in collection units of time of one hour, 12 hours, one day, and one week.

FIG. 26 illustrates an example of the information device table 3122 in the second embodiment. The information device table 3122 includes columns for the items of the information device ID, the power consumption, the electric energy consumption, the operation state, the power supply used and history information. Rows exist for each information device. The Information Device ID item stores an information device ID (for example PC #1) that uniquely distinguishes an information device such as a PC 6 or a shared device 7. The Zone ID item stores a zone ID indicating a zone to which the information device indicated by the information device ID in the same row belongs. The Power Consumption and the Electric Energy Consumption items store the power consumption and the electric energy consumption of the information device indicated by the information device ID in the same row.

The Operation State item stores information indicating the operation state of the information device indicated by the information device ID in the same row. The operation state is, for example, on, off, or sleeping. On is the state in which the information device is operating, and off is the state in which the information device is stopped. Sleeping is the state in which the power consumed is less than in the on state, and from which the time required for the information device to reach the operating state is shorter than from the off state. The Power Supply Used item stores information indicating the power supply used by the information device indicated by the information device ID in the same row. The power supply is, for example, battery or alternating current (AC). Battery is the state in which a primary or second battery of the information device is used as a power supply, and AC is the state in which a power supply external to the information device, for example, a commercial power mains is used.

The History Information item stores the history of changes in the operation state of the information device indicated by the information device ID in the same row. Specifically, the history includes information that indicates the time at which the operation state changed, in combination with the operation state after the change. For example, the information device table 3122 of FIG. 26 stores that the information device (PC 6) indicated by PC #1 belongs to the zone indicated by ZONE #1, and that power consumption, power consumption amount, operation state, power supply used, and history information of that information device are, respectively, "pw01", "ee01", "SLEEPING", "BATTERY", and "XXXX".

FIG. 27 illustrates an example of a facility device table 3123 in the second embodiment. The facility device table 3123 includes columns for the items of the Facility device ID, the Zone ID, the Power Consumption, the Electric Energy Consumption, the Operation State, and the History Information. Rows exist for each facility device 4. The Facility device ID item stores a facility device ID that uniquely distinguishes the facility device 4. The Zone ID item stores a zone ID that indicates the zone in which the facility device 4 indicated by the facility device ID in the same row is provided. The Power Consumption and the Electric Energy Consumption items store, respectively, the power consumption and electric energy consumption of the facility device 4 indicated by the facility device ID in the same row. The Operation State item stores the operation state of the facility device 4 indicated by the facility device ID in the same row. The operation state is, for example, on or off. The History Information item stores a history of changes in the operation state of the facility device 4 indicated by the facility device ID in the same row. The history is the same kind of information as the history information in the information device table 3122. For example, the facility device table 3123 of FIG. 27 stores that the facility device 4 indicated by FACILITY DEVICE #2 belongs to the zone indicated by ZONE #1, and that the power consumption, power consumption amount, operation state, and history information of the facility device 4 are, respectively, "pw12", "ee12", "ON", and "BBBB".

Returning now to FIG. 19, the description of the energy management server 300 will be continued. When the database updater 313 acquires entry-exit information from the entry-exit management system 2, it updates the entry-exit table 3112, based on the entry-exit information. The entry-exit information includes a personal ID that uniquely distinguishes a person who has entered or exited and information indicating whether the person who has either entered or exited the building. The database updater 313 updates the state (entry/exit) in the entry-exit table 3112 corresponding with the personal ID included in the entry-exit information, based on the entry-exit-exit information. When the database updater 313 acquires presence-absence information from the detection sensors 3 provided in each of the zones, it updates the detection results table 3111, based on the presence-absence information. The presence-absence information includes a zone ID that uniquely identifies the zone, and information indicating the presence or absence of a person or persons in that zone. The database updater 313 updates whether or not a person associated with the zone ID included in the presence-absence information is present-absent (presence or absence), based on the presence-absence information.

The data processor 314 generates data, based on the presence-absence information acquired from the database updater 313 and on the zone IDs of a plurality of zones of the building. Specifically, the data processor 314 collects information stored in the detection results table 3111, the entry-exit table 3112 and the tenant table 3113 and detects the zone IDs for the zone, the personal ID for the person or the tenant ID for the tenant for which a change occurred in the information. The data processor 314 may collect information at a fixed interval, or may collect information in response to a request from the information device management server 600. The data processor 314 outputs to the communicator 315 the collection results as data including the zone ID of a zone that has changed, the personal ID of a person and the tenant ID of a tenant and makes a request to the communicator 315 to transmit the collection results. The data processor 314 may further include into the collection results the zone IDs of zones in which persons are present. The data processor 314 detects the tenant which uses the zone in which the state of detecting a person has changed based on the tenant table 3113 and adds the tenant ID of the detected tenant to the collection results. The data processor 314 collects the detection results table 3111 and the entry-exit table 3112 in the in-building database 311 at a fixed interval and generates the collection results as data. In this case, the collection results include information indicating the zones in which persons are present and the zones in which persons are not present, the personal IDs of persons currently in the building and information indicating the tenants of the zones in which persons are present and the tenants of the zones in which persons are not present. The communicator 315 transmits to the information device management server 600 the collection results output from the data processor 314.

The data processor 314 receives state information from the information device management server 600 as the first power consumption information, via the communicator 315. The state information is information regarding power consumed by information devices such as PCs 6 and shared devices 7. The state information includes information indicating, for example, the information device ID, the zone ID of a zone to which the information device indicated by the information device ID belongs, the power consumption, the electric energy consumption of the information device, and information indicating the operation state, information indicating power supply used, information indicating whether or not the information device is being used, and the time at which operation indicated by the operation state started. Whether or not an information device is being used is determined based on the operation state of the information device, and whether a user operation has been accepted by an input device (keyboard, mouse, or the like) provided in the information device.

The data processor 314 updates the information device table 3122, based on the first power consumption information. Specifically, the data processor 314 detects a row in the information device table 3122 that includes an information device ID coinciding with the information device ID included in the acquired first power consumption information. The data processor 314 updates the information in the items included in the detected row, based on the acquired first power consumption information. Regarding the history information, the data processor 314 determines whether or not the operation state has changed, based on the information indicating the operation state included in the state information. If an operation state change is detected, the data processor 314 updates the history information by appending to the history information information indicating the operation state after the change and the time of the start of that operation state.

The data processor 314, based on either information stored in the information device table 3122 or the first power consumption information, updates information regarding each of the information devices and the total power and total electric energy in the zone table 3121. For example, the data processor 314 reads the power consumption of the row that includes the information device ID indicating the PC 6 for each zone ID from the information device table 3122. The data processor 314 calculates the total values of the read-out power consumption for each zone ID and updates the PC power in the zone table 3121 with the total value, for each zone. By a similar operation, the data processor 314 updates the power and the other powers, total powers of the shared devices, and the electric energy and total electric energy of information devices in the zone table 3121.

The data processor 314 may acquire the state information by requesting the state information from the information device management server 600, via the communicator 315, or may acquire the state information by periodic transmission from the information device management server 600. The data processor 314 may, each time state information is acquired as the first power consumption information, update the information device table 3122 and the zone table 3121, or may update the information device table 3122 and the zone table 3121 at some fixed period.

The communicator 315, in addition to communicating with the information device management server 600 as described above, communicates with the monitoring terminal 10. The communicator 315, in response to a request for information received from the monitoring terminal 10, reads out information stored in the power consumption database 312 and returns the information.

The facility device controller 316 controls the facility devices 4 in each zone of the building based on the detection results table 3111. For example, if there is no person in zones A and D, the facility device controller 316 stops facility devices 4 provided in zones A and D or lowers the operating level of the facility devices 4 so as to reduce the power consumption.

The facility device controller 316 acquires second power consumption information from each of the facility devices 4. The second power consumption information is information regarding the power consumed by a facility device 4. The second power consumption information includes, for example, a facility device ID, a zone ID of the zone in which the facility device 4 indicated by the facility device ID is located, the power consumption of the facility device 4, the electric energy consumption of the facility device 4, information indicating the operation state of the facility device 4, and the time at which the operation indicted by the operation state started. The facility device controller 316 updates the facility device table 3123, based on the second power consumption information. Specifically, the facility device controller 316 detects a row in the facility device table 3123 that includes a facility device ID coinciding with the facility device ID included in the acquired second power consumption information. The facility device controller 316 updates the information in the items included in the detected row, based on the acquired second power consumption information.

The facility device controller 316 updates the various information regarding the facility device 4 and the total power and total electric energy in the zone table 3121, based on the information stored in the facility device table 3123 or on the second power consumption information. For example, the facility device controller 316 reads out, for each zone ID, the power consumption in the row that includes the facility device ID indicating the air-conditioning equipment. The facility device controller 316 reads out the total value of the read-out power consumption for each zone ID and updates the power of the air-conditioning equipment in the zone table 3121 with the total value, for each zone. By a similar operation, the facility device controller 316 updates the power of the lighting device, the power of the other, total power, the electric energy of the facility devices and the total electric energy in the zone table 3121.

The facility device controller 316 may acquire the second power consumption information from the facility devices 4 at a predetermined period, or may acquire the second power consumption information from the facility devices 4 at each predetermined time. The facility device controller 316 may, each time second power consumption information is acquired, update the facility device table 3123 and the zone table 3121, or may update the facility device table 3123 and the zone table 3121 at some fixed period.

The power supply 317 supplies power received from an external generator or commercial power mains to the in-building database 311, the power consumption database 312, the database updater 313, the data processor 314, the communicator 315, and the facility device controller 316 provided in the energy management server 300. Even if the power supply 317 cannot receive power from the external generator or the commercial power mains, it may hove a rechargeable battery or the like so that supply of power can continue.

Figures 28, 29:
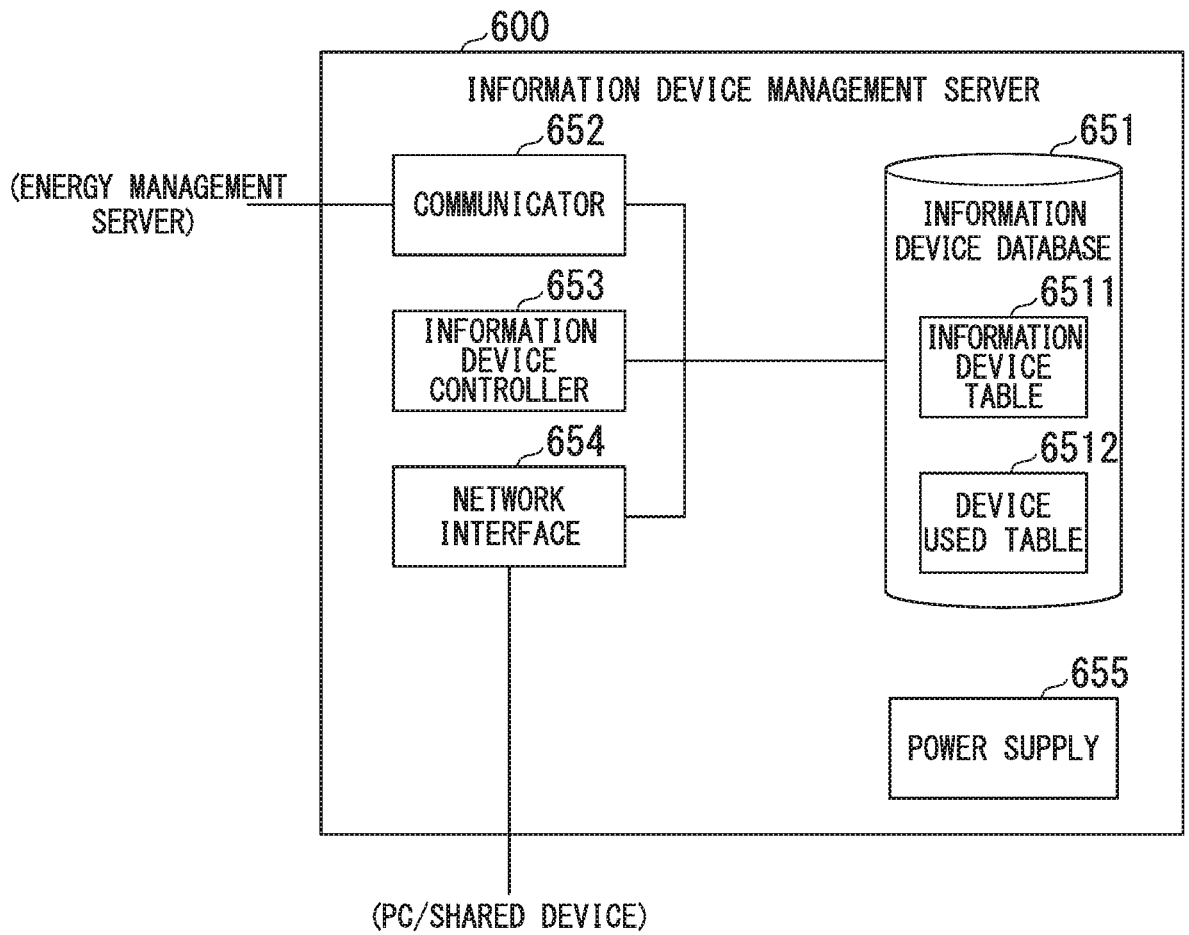
FIG. 28 is a block diagram illustrating an example of the configuration of an information device management server in the second embodiment.
FIG. 29 illustrates an example of an information device table in the second embodiment.

FIG. 28 is a block diagram illustrating an example of the configuration of the information device management server 600 in the second embodiment. The information device management server 600 has an information device database 651, a communicator 652, an information device controller 653, a network interface 654, and a power supply 655. The information device database 651 stores an information device table 6511 and a device used table 6512 as information device information regarding information devices. The information device table 6511 stores the zones to which the PCs 6 and the shared devices 7 belong. Specifically, it stores combinations of information device IDs that uniquely distinguish the PCs 6 and the shared devices 7, zone IDs that indicate the zones to which the PCs 6 or shared devices 7 belong and tenant IDs that indicate the tenants which use the zones. For example, even if the PC 6 is a laptop computer that a person can carry around and use, the PC 6 belongs to some zone. The laptop PC 6 belongs to a tenant that uses a zone to which it belongs. For example, a laptop PC 6 is made to belong to the zone in which it is mainly used. That is, all of the PCs 6 and all of the shared devices 7 belong to a zone and a tenant. The device used table 6512 stores information indicating the PCs that are used by persons. Specifically, the device used table 6512 stores combinations of personal IDs of persons and information device IDs that uniquely distinguish the PCs 6.

FIG. 29 illustrates an example of an information device table 6511. The information device table 6511 includes columns for the Information Device ID item, for the Zone ID item and for the Tenant ID item. Rows exist for each information device. The Information Device ID item stores an information device ID that distinguishes an information device (for example PC #1). The Zone ID item stores a zone ID indicating the zone to which the information device distinguished by the information device ID of the same row belongs. The Tenant ID item stores a tenant ID indicating the tenant to which the information device distinguished by the information device ID of the same row belongs. In other words, the Tenant ID item stores a tenant ID indicating the tenant using the zone to which the information device distinguished by the information device ID of the same row belongs. That is, the information device table 6511 stores combinations of information device IDs of information devices, zone IDs of zones to which the information devices belong and tenant IDs of tenants to which the information devices belong. For example, the information device table 6511 of FIG. 29 stores that the information device distinguished as SHARED DEVICE #2 is mainly used in the zone indicated by ZONE #1. Although an example is illustrated in which one information device ID, one zone ID and one tenant ID are associated with each other in FIG. 29, a plurality of zone IDs may be associated with an information device ID.

Figures 30, 31:
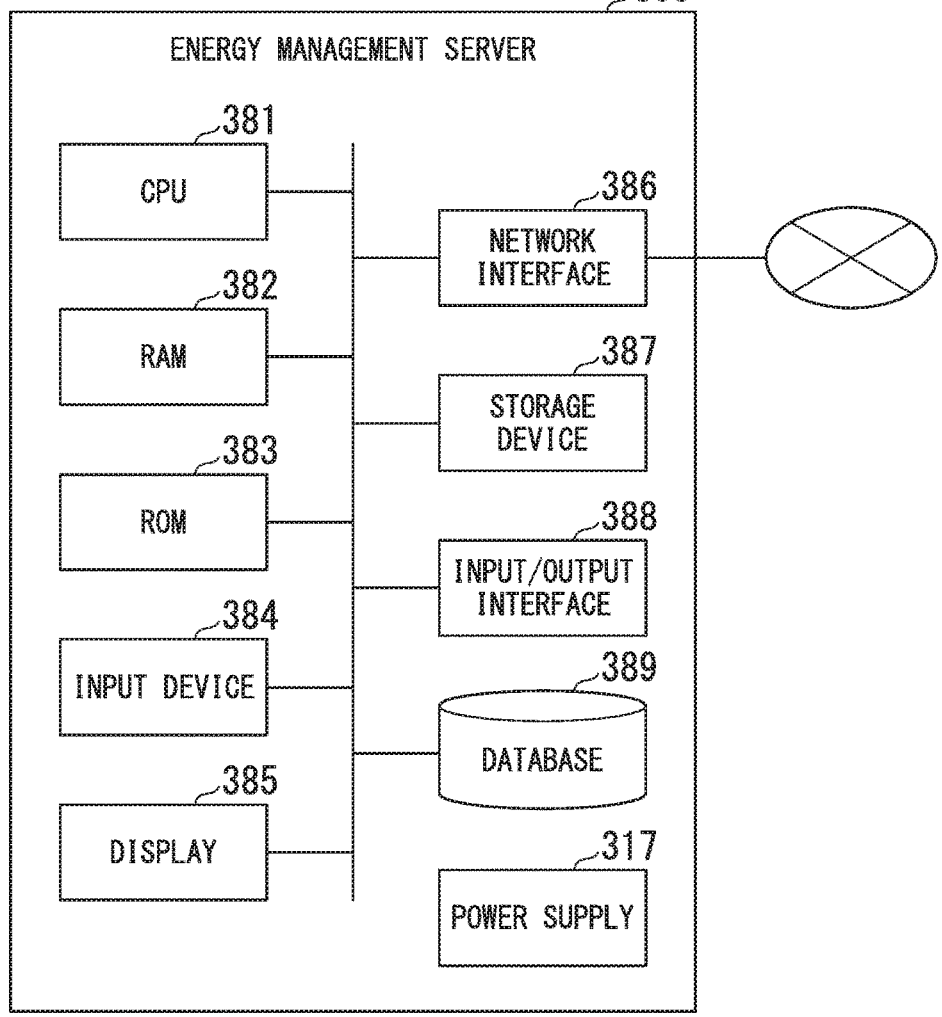
FIG. 30 illustrates an example of a device used table in the second embodiment.
FIG. 31 is a block diagram illustrating an example of the hardware configuration of an energy management server in the second embodiment

FIG. 30 illustrates an example of the device used table 6512. The device used table 6512 includes columns for the Personal ID item and the Information Device ID item. Rows exist for each person entering and exiting the building. The Personal ID item stores personal IDs (for example, PERSON #1). The Information Device ID item stores information device IDs that indicate information devices used by a person identified by the personal ID in the same row. For example, the device used table 6512 of FIG. 30 stores that the person distinguished as PERSON #1 uses the information device distinguished as PC #1. Although an example has been illustrated in which there is a one-to-one correspondence between the personal IDs and the information device IDs in FIG. 30, if a person uses a plurality of information devices, a plurality of information device IDs may be associated with a personal ID.

Returning now to FIG. 28, the description of the information device management server 600 will be continued. The communicator 652 communicates with the energy management server 300. The communicator 652 receives the collection results as data transmitted from the energy management server 300, and outputs the collection results to the information device controller 653. The information device controller 653, based on the information device table 6511 and the device used table 6512 stored in the information device database 651, and collection results as data, selects a PC 6 or a shared device 7 as a target for reduction of power consumption. The information device controller 653 controls the selected PC 6 or shared device 7 so as to suppress the power consumed by the PC 6 or the shared device 7. For example, the information device controller 653 transmits to the PC 6 and the shared device 7 belonging to a zone in which there are no persons control information that includes an instruction to change the operation state to offer sleeping.

The information device controller 653 acquires, via the network interface 654, state information from each of the information devices that are the PCs 6 and the shared devices 7. The information device controller 653 transmits the acquired state information to the energy management server 300, via the communicator 652. The information device controller 653, at a predetermined period or time, transmits a request to each of the information devices that are the PCs 6 and shared devices 7 to transit the state information and acquires the state information returned as a response. The information device controller 653 may acquire state information transmitted from the information devices that are the PCs 6 and the shared devices 7 at a fixed period via the network interface 654. There are cases in which a stopped PC 6 or a shared device 7 for which the operation state is off cannot make a response to the information device controller 653 with respect to a request from the information device controller 653. In such cases, the information device controller 653 treats the operation state of the PC 6 or shared device 7 information device from which a response has not been obtained as being off and generates the state information of the information device and transmits it to the energy management server 300.

The network interface 654 communicates with PCs 6 and shard devices 7 located inside the building. The network interface 654 transmits the control information generated by the information device controller 653 to a PC 6 or a shared device 7. The network interface 654 receives state information from the PC 6 or the shared device 7 that is the control target and makes a request to the communicator 652 to transmit the received state information to the energy management server 300.

The power supply 655 supplies power received from an external generator or commercial power mains to the information device database 651, the communicator 652, the information device controller 653, and the network interface 654 of the information device management server 600. Similar to the power supply 317 provided in the energy management server 300, the power supply 655 may have a rechargeable battery or the like, so that (he supply of power can be continued even if the power supply 655 cannot receive power from the external generator or the commercial power mains.

FIG. 31 is a block diagram illustrating an example of the hardware configuration of the energy management server 300. The energy management server 300 has a CPU 381, a RAM 382, a ROM 383, an input device 384, a display 385, a network interface 386, a storage device 387, an input/output interface 388, a database 389, and a power supply 317. The CPU 381 reads out a program stored non-temporarily in the storage device 387, which is constituted by a HDD or SSD (solid-state drive) or in the ROM 383 into the RAM 382, and executes the read-out program. The CPU 381, by executing processing in response to operation by a user or administrator input to the input device 384, such as a mouse or keyboard, operates as the database updater 313, the data processor 314, and the facility device controller 316. The network interface 386 operates as the communicator 315. The database 389 operates as the in-building database 311 and the power consumption database 312.

The CPU 381, via the input/output interface 388, acquires entry-exit information from the entry-exit management system 2 and acquires presence-absence information from each of the detection sensors 3. The CPU 381 operating as the database updater 313, based on the acquired entry-exit information and presence-absence information, updates the information stored in the database 389 operating as the in-building database 311. The CPU 381 operating as the data processor 314 collects information stored in the database 389 operating as the in-building database 311 and the power consumption database 312. The network interface 386 operating as the communicator 315 transmits the collection results obtained by the collection to the information device management server 600.

The CPU 381 operating as the data processor 314 and the facility device controller 316 acquires the first and second power consumption information. Based on the first and second power consumption information, the CPU 381 updates the information stored in the database 389 operating as the power consumption database 312. The display 385 displays information of the power consumption database 312 included in the database 389. The display 385, for example, displays the zone table 3121, the information device table 3122, and the facility device table 3123 illustrated in FIG. 25, FIG. 26, and FIG. 27. By displaying for each zone the power consumed by the facility devices and the information devices, the energy management server 300 enables monitoring of the power consumed by all devices related to the building. In this manner, the energy management server 300 may be implemented by hardware having the CPU 381 that executes a program.

Similar to the energy management server 300, the information device management server 600 may be implemented by hardware having a CPU that executes a program. In that case, the CPU 381 operates as the information device controller 653, by executing processing in response to an operation by a user or administrator input to the input device 384 such as a mouse or keyboard.

The monitoring terminal 10, in addition to making a request to the energy management server 300 for information stored in the in-building database 311 or the power consumption database 312, may request updating of information stored in power consumption database 312. If a request for updating of information is made from the monitoring terminal 10, in the energy management server 300, the data processor 314 acquires the first power consumption information of each of the information devices from the information device management server 600 and updates the information stored in the zone table 3121 and the information device table 3122. The facility device controller 316 acquires the second power consumption information from each of the facility devices 4 and updates the information stored in the zone table 3121 and the information device table 3122.

A PC 6 in the building may perform the same operation as that of the monitoring terminal 10. For example, for a person using a PC 6 in the building to confirm the power consumed in the building, the user may operate the PC 6 to make a request to the energy management server 300 for information stored in the power consumption database 312. By displaying the zone table 3121, the information device table 3122, and the facility device table 3123 acquired from the energy management server 300 on the PC 6, the person using the PC 6 can confirm the power consumed in the building. In the monitoring terminal 10 and the PC 6, when displaying information regarding the power consumption related to the building, a graph or table generated based on information of the zone table 3121, the information device table 3122, and the facility device table 3123 may be displayed on the monitoring terminal 10 or the PC 6.

Figure 32:
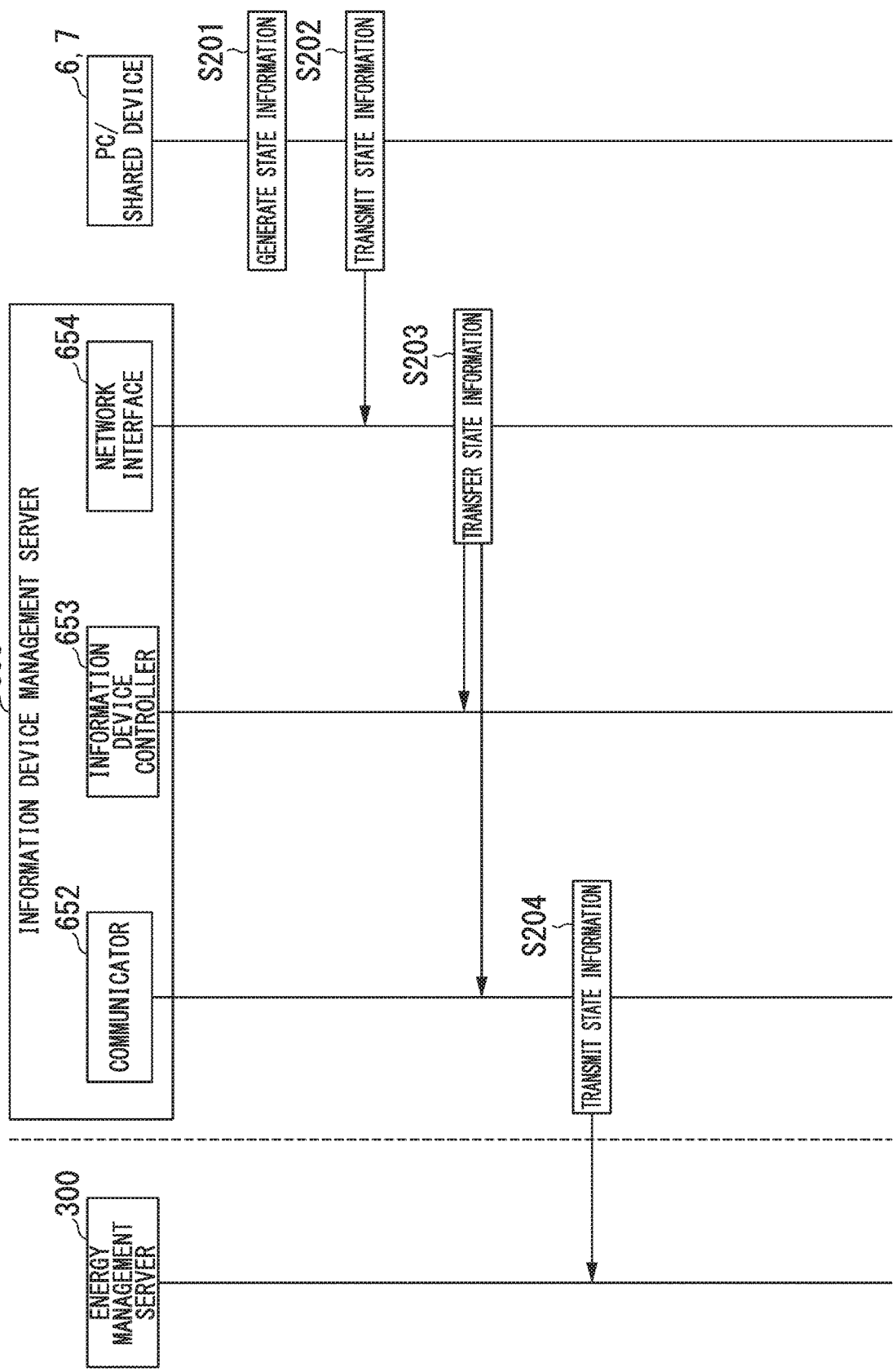
FIG. 32 is a first sequence diagram illustrating the operation in the overall management system of the second embodiment.
Figure 33:
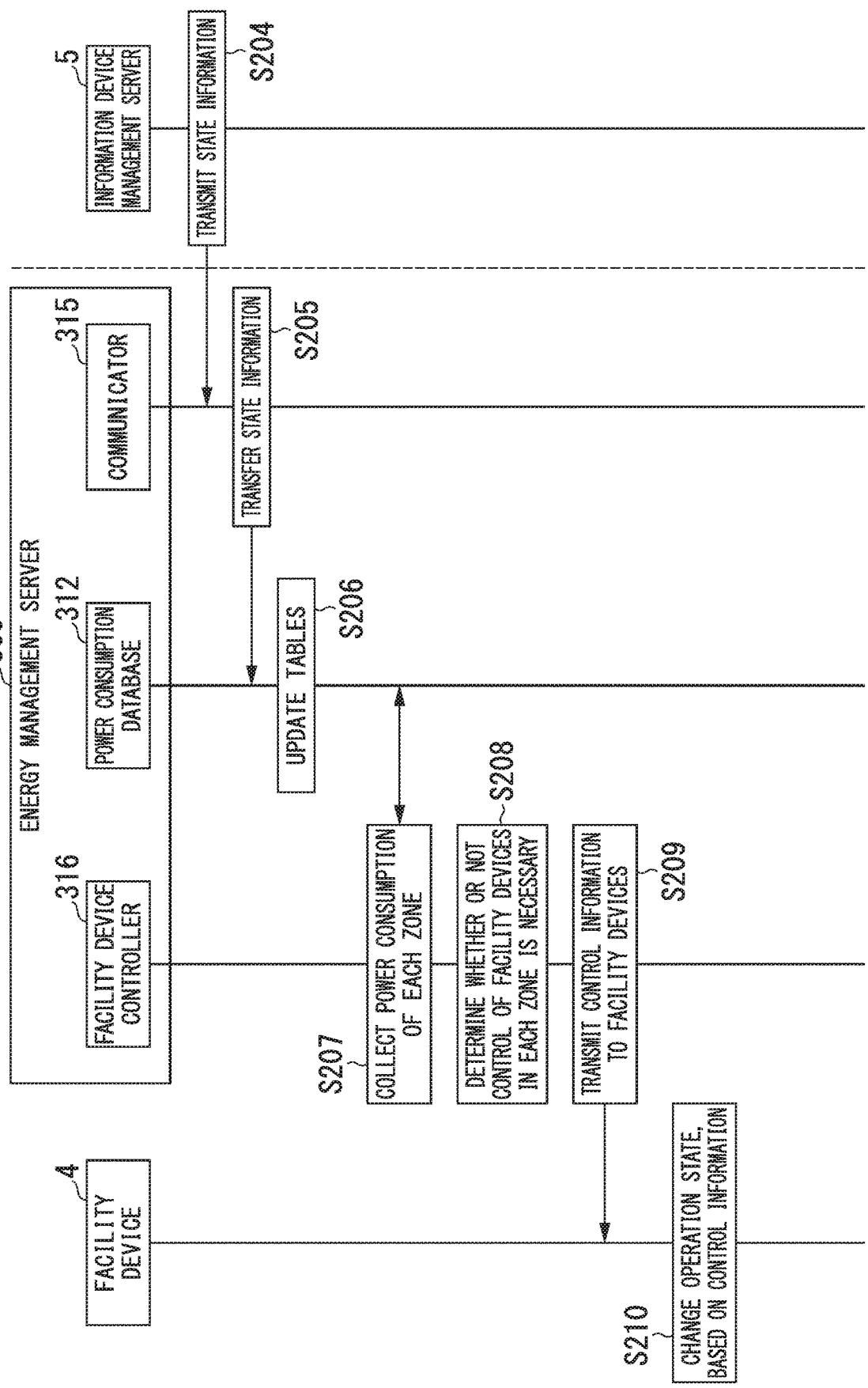
FIG. 33 is a second sequence diagram illustrating the operation in the overall management system of the second embodiment.

The operation of the overall management system of the second embodiment will now be described, with references made to FIG. 32 and FIG. 33. FIG. 32 and FIG. 33 are sequence diagrams illustrating the processing for the information device management server 600 to transmit the acquired state information to the energy management server 300, and for the energy management server 300 to update the power consumption database 312 and to control the facility device 4 based on the state information as the first power consumption information.

A PC 6 or a shared device 7 generates state information regarding the power dial itself consumes (step S201). The generation of the state information by the PC 6 or the shared device 7 may be performed upon receiving a request by the information device management server 600, or may be performed at a pre-established period or time. The PC 6 or shared device 7 may generate the state information upon receiving an operation by a person. The PC 6 or shared device 7 transmits the state information to the information device management server 600 (step S202).

In the information device management server 600, the network interface 654 transfers the state information received from the PC 6 or the shared device 7 to the information device controller 653 and the communicator 652 (step S203). The communicator 652 transmits the state information to the energy management server 300 via the network interface 654 (step S204). The communicator 652 may group a plurality of state information that are obtained from a plurality of PCs 6 and shared devices 7 and temporarily stored and transmit them to the energy management server 300, or may transmit to the energy management server 300 each time state information is obtained.

If the state information transmitted from the information device that is a PC 6 or a shared device 7 docs not include a zone ID of the zone to which the information device belongs, the information device controller 653 performs processing to append the zone ID to the state information received, via the network interface 654. The information device controller 653 acquires from the information device table 6511 the zone ID corresponding to the information device ID included in the state information and appends the acquired zone ID to the state information. The information device controller 653 transmits the state information that includes the zone ID to the energy management server 300 via the communicator 652. When the information device controller 653 is to send the state information to the energy management server 300, it is not necessary to transfer the state information to the communicator 652 from the network interface 654.

In the energy management server 300, the communicator 315 transfers to the data processor 314 the state information received from the information device management server 600 (step S205). The data processor 314, based on the state information, updates the information device table 3122 and the zone table 3121 stored in the power consumption database 312 (step S206). The facility device controller 316 collects power consumption information of the facility devices 4 stored in the zone table 3121 (step S207). The collection by the facility device controller 316 includes, for example, detecting, based on the power consumption information, zones in which information devices are not being used, calculating for each zone the proportion of the power consumption in the zone that is consumed by the facility devices 4, and calculating the ratio of power consumption between the facility devices 4 and the information devices related to the building. The collection by the facility device controller 316 further includes determining whether information devices is used in each tenant, calculating for each tenant the proportion of the power consumption of the facility devices 4 with respect to the total power consumption, and calculating for each tenant the ratio of power consumption between the facility devices 4 and the information devices.

Based on the collection results, the facility device controller 316 determines for each zone whether or not control is required with respect to the facility devices 4 (step S208). For example, when an information device is not being used in all of zones which are used by some tenant, the facility device controller 316 determines whether or not there is a facility device 4 operating in the zones. If there is a facility device 4 operating in such as zone, the facility device controller 316 transmits control information that includes an instruction to stop or lower the operating level to the facility device 4 operating in that zone (step S209). The facility device 4 that has received the control information changes the operation state (step S210).

A zone in which an information device such as a PC 6 and a shared device 7 or the like is not operating is, for example, a zone in which the total value of power consumption of the PCs 6 and shared devices 7 is less than a certain value, and a zone that is determined, based on presence-absence information, that no person is using. The energy management server 300, based on the operation state of the PCs 6 and the shared devices 7 controlled by the information device management server 600, can reduce the power consumption without sacrificing a person's convenience, by slopping or reducing the operating level of facility devices 4 in the zone.

According to the management system of the second embodiment, the energy management server 300 acquires and stores the power consumed by each information device and facility device 4 in the building. Because the energy management server 300 collects the power consumptions of each information devices und facility device 4 for each of a plurality of zones in the building, it can monitor the power consumption in the building. By the energy management server 300 performing control to suppress the power consumed by facility devices 4 based on the power consumption by zones, it is possible to reduce the power consumption.

The facility device controller 316 may detect a tenant in which the power consumed by information devices is above a certain value and perform control to suppress the power consumed by the facility devices 4 in detected zone which the detected tenant uses. By this control, the management system is able to suppress the total power consumption for each tenant and to suppress the power consumption in the overall building.

The data processor 314 may detect a tenant which uses a zone in which a person is present, based on the detection results table 3111 and the tenant table 3113, and make a request to information device management server 600 for state information regarding the information devices belonging to the detected tenant. By acquiring state information of the information devices in a zone in which persons are present and updating the power consumption database 312 by the data processor 314, it is possible to increase the frequency of updating the power consumption information of zones estimated to have a high power consumption by information devices, and to improve the real-time response of monitoring of the power consumption.

The configuration described has been one in which the history information of the information devices in the information device table 3122 is updated by the data processor 314 based on the state information. However, the PCs 6 and the shared devices 7 may each generate history information themselves and transmit state information that includes the history information to the information device management server 600 and the energy management server 300. If the PCs 6 and the shared devices 7 each generate history information themselves, each time the operation state changes, the operation state after the change and the current time are stored in combination. The time series of the combinations of operation state after changes and the current times are the history information for each of the information devices.

In the second embodiment, the description has been for a configuration in which, in the energy management server 300, the database updater 313 stores presence-absence information obtained from the sensors into the detection results table 3111, and the data processor 314 collects information stored in the detection results table 3111 and transmits the obtained data to the information device management server 600. However, the energy management server 300 may transmit to the information device management server 600 presence-absence information obtained from each detection sensor 3. If the information device management server 600 receives presence-absence information, a sensor table into which are stored the combination of a sensor ID that uniquely distinguishes a detection sensor 3 and the information device ID of an information device located in the person-detection range of the detection sensor 3 may be stored into the information device database 651. By having a sensor table, the information device management server 600 can control the information devices based on the presence-absence information.

Figure 34:
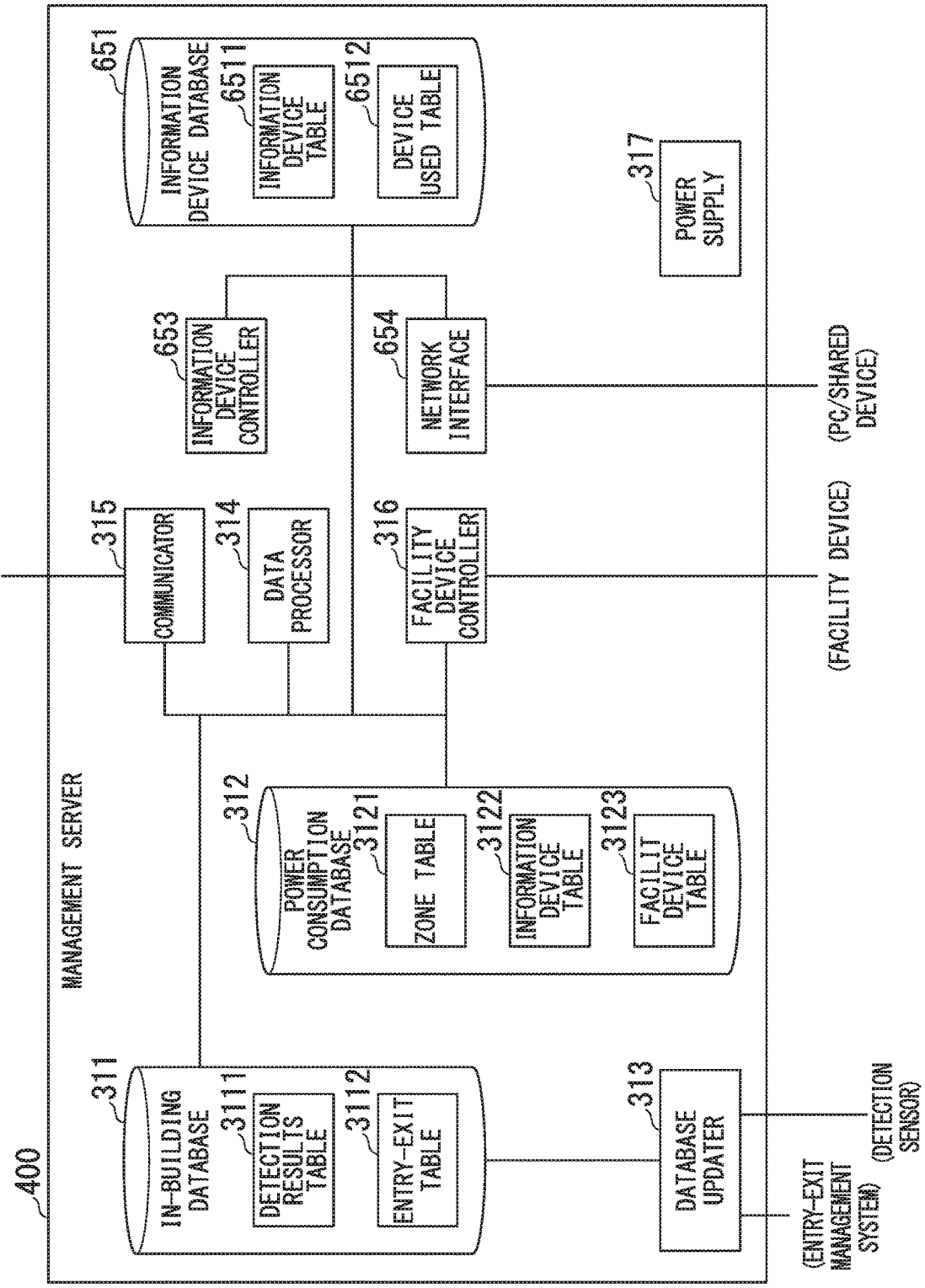
FIG. 34 is a block diagram illustrating another example of the configuration of the management system in the second embodiment.

The management system according to the second embodiment may have one management server 400 in place of the two servers of the energy management server 300 and the information device management server 600. FIG. 34 is a block diagram illustrating another example of the configuration of the management system in the second embodiment. The management server 400 have an in-building database 311, and a power consumption database 312, a database updater 313, a data processor 314, a communicator 315, a facility device controller 316, a power supply 317, an information device database 651, an information device controller 653, and a network interface 654. By configuring the energy management serve 300 and the information device management server 600 as one server, the communicator 652 for communicating between the energy management server 300 and the information device management server 600 is omitted. The power supply 655 is also omitted. By using the management server 400, processing performed by the energy management server 300 and the information device management server 600 may be performed by one server.

In the first and second embodiments, the description has been for the case in which the division of the region of the building into zones to which PCs 6 belong is the same as the division of the building into zones to which the shared devices 7 belong. However, the method of establishing the zones with respect to the PCs 6 may be different from the method of establishing the zones with respect to the shared devices 7. For example, in the example of the zones illustrated in FIG. 5, in contrast to the PCs 6 belonging to any one of the zones A to F, the shared devices 7 may be placed belonging to any one of zone a, which is a combination of zones A and B, zone b, which is a combination of zones C and F, or zone c, which is a combination of zones D and E. Establishing zones in this manner is effective for example, if a shared device 7 is a printer or multifunction printer used by PCs 6 belonging to zones A and B and a shared device 7 is a network switch connected to PCs 6 belonging to zones A and B.

According to at least one of the above-described embodiments, by having a data processor that acquires either first power consumption information regarding power consumed by information devices or state information, a facility device controller that acquires second power consumption information regarding power consumed by facility devices, and a power consumption database that stores the first and second power consumption information, it is possible to monitor the energy consumed in a building.

While certain embodiments been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An energy management apparatus that is used in a management system having an information device management apparatus that has a first storage storing information device information regarding at least one information device, the energy management apparatus comprising:
 a receiver configured to receive, regarding zones related to a building, a detection signal regarding detection of a person in each of the zones;
 a first acquisitor configured to make, based on the detection signal, a request to the information device management apparatus for state information indicating a status of the at least one information device and acquire the state information from the information device management apparatus;
 a controller configured to control a facility device in the zones based on the detection signal received by the receiver;
 a second acquisitor configured to acquire second power consumption information regarding power consumed by the facility device in the zones; and
 a second storage configured to store first power consumption information regarding power that is acquired based on the state information and consumed by the at least one information device and the second power consumption information in connection with the zones.

2. The energy management apparatus according to claim 1,
 wherein the first acquisitor makes a request to the information device management apparatus for the first power consumption information of the at least one information device regarding a zone selected based on the detection signal and stores the first power consumption information in the second storage.

3. The energy management apparatus according to claim 2,
 wherein the controller controls the facility device based on the first power consumption information and the second power consumption information stored in the second storage and the detection signal.

4. A management system comprising:
 an energy management apparatus; and
 an information device management apparatus,
 wherein the information device management apparatus includes:
 a first storage configured to store information device information regarding at least one information device;
 a first acquisitor configured to acquire status information indicating a status of at least one information device from the at least one information device; and
 a communicator configured to send the status information acquired by the first acquisitor to the energy management apparatus in response to a request from the energy management apparatus, and
 wherein the energy management apparatus includes:
 a receiver configured to receive, regarding zones related to a building, a detection signal regarding detection of a person in each of the zones;
 a second acquisitor configured to make, based on the detection signal, a request to the information device management apparatus for the state information and acquire the state information from the information device management apparatus;
 a controller configured to control a facility device in the zones based on the detection signal received by the receiver;
 a third acquisitor configured to acquire second power consumption information regarding power consumed by the facility device in the zones; and
 a second storage configured to store first power consumption information regarding power that is acquired based on the state information and consumed by the at least one information device and the second power consumption information in connection with the zones.

5. A power consumption monitoring method performed by an energy management apparatus that is used in a management system having an information device management apparatus that has a first storage storing information device information regarding at least one information device, the power consumption monitoring method comprising the steps of:
 receiving, regarding zones related to a building, a detection signal regarding detection of a person in each of the zones;
 making, based on the detection signal, a request to the information device management apparatus for state information indicating a status of the at least one information device;
 acquiring the state information from the information device management apparatus;
 controlling a facility device in the zones based on the detection signal received by the receiving step;
 acquiring second power consumption information regarding power consumed by the facility device in the zones; and
 storing first power consumption information regarding power that is acquired based on the state information and consumed by the at least one information device and the second power consumption information in connection with the zones.

6. A non-transitory computer-readable recoding medium having a program executed by a computer provided in an energy management apparatus that is used in a management system having an information device management apparatus that has a first storage storing information device information regarding at least one information device, the program for causing the computer to execute the steps of:
 receiving, regarding zones related to a building, a detection signal regarding detection of a person in each of the zones;
 making, based on the detection signal, a request to the information device management apparatus for state information indicating a status of the at least one information device;
 acquiring the state information from the information device management apparatus;

controlling a facility device in the zones based on the detection signal received by the receiving step;

acquiring second power consumption information regarding power consumed by the facility device in the zones; and storing first power consumption information regarding power that is acquired based on the state information and consumed by the at least one information device and the second power consumption information in connection with the zones.

7. An energy management apparatus that is used in a management system having an information device management apparatus that has a first storage storing information device information regarding at least one information device, the energy management apparatus comprising:

a receiver configured to receive, regarding each of sections used by tenants related to a building, a detection signal regarding detection of a person in each of the sections;

a first acquisitor configured to make, based on the detection signal, a request to the information device management apparatus for state information indicating a status of the at least one information device and acquire the state information from the information device management apparatus;

a controller configured to control a facility device in the sections based on the detection signal received by the receiver;

a second acquisitor configured to acquire second power consumption information regarding power consumed by the facility device in the sections; and a second storage configured to store first power consumption information regarding power that is acquired based on the state information and consumed by the at least one information device and the second power consumption information in connection with the sections.

* * * * *